(12) United States Patent
Uenaka

(10) Patent No.: US 7,224,893 B2
(45) Date of Patent: May 29, 2007

(54) ANTI-SHAKE APPARATUS

(75) Inventor: Yukio Uenaka, Tokyo (JP)

(73) Assignee: PENTAX Corporation, Tokyo (JP)

( * ) Notice: Subject to any disclaimer, the term of this patent is extended or adjusted under 35 U.S.C. 154(b) by 121 days.

(21) Appl. No.: 11/071,242

(22) Filed: Mar. 4, 2005

(65) Prior Publication Data

US 2005/0196160 A1 Sep. 8, 2005

(30) Foreign Application Priority Data

Mar. 8, 2004 (JP) .......................... P2004-063909

(51) Int. Cl.
*G03B 17/00* (2006.01)
*H04N 5/228* (2006.01)
(52) U.S. Cl. .................................... 396/55; 348/208.7
(58) Field of Classification Search .................. 396/52, 396/55; 348/208.7, 208.8, 208.11; 359/554–557
See application file for complete search history.

(56) References Cited

U.S. PATENT DOCUMENTS

| | | | | |
|---|---|---|---|---|
| 5,479,236 | A | * 12/1995 | Tanaka | 396/55 |
| 5,850,575 | A | * 12/1998 | Ohishi | 396/52 |
| 5,974,269 | A | 10/1999 | Sato et al. | 396/55 |
| 6,603,927 | B2 | * 8/2003 | Enomoto | 396/55 |
| 2003/0067544 | A1 | 4/2003 | Wada | 348/208.7 |

FOREIGN PATENT DOCUMENTS

| JP | 10-142647 | 5/1998 |
|---|---|---|
| JP | 2002-229090 | 8/2002 |
| JP | 2003-110919 | 4/2003 |

OTHER PUBLICATIONS

U.S. Appl. No. 11/044,055 to Uenaka et al., which was filed on Jan. 28, 2005.
U.S. Appl. No. 11/044,054 to Uenaka, which was filed on Jan. 28, 2005.
U.S. Appl. No. 11/065,577 to Uenaka, which was filed on Feb. 25, 2005.
U.S. Appl. No. 11/044,010 to Uenaka et al., which was filed on Jan. 28, 2005.

(Continued)

*Primary Examiner*—W. B. Perkey
(74) *Attorney, Agent, or Firm*—Greenblum & Bernstein, P.L.C.

(57) ABSTRACT

An anti-shake apparatus of a photographing apparatus includes a signal processor. A fixed unit slidably supports, in perpendicular first and second directions, a movable unit having an imaging device or a hand-shake correcting lens. The movable unit or fixed unit has a magnetic-field change detector which has a horizontal magnetic-field change-detecting element for detecting a first location and a vertical magnetic-field change-detecting element for detecting a second location. Another of the movable unit and the fixed unit has a position-detecting magnet unit which faces the magnetic-field change detector. The signal processor outputs a first detected-position signal and a second detected-position signal. The controller calculates the first location for the first detected-position signal and the second location for the second detected-position signal. The controller maximizes a width between minimum and maximum values of the first detected-position signal and between minimum and maximum values of the second detected-position signal.

8 Claims, 14 Drawing Sheets

OTHER PUBLICATIONS

U.S. Appl. No. 11/073,638 to Uenaka et al., which was filed on Mar. 8, 2005.
U.S. Appl. No. 11/073,604 to Uenaka, which was filed on Mar. 8, 2005.
U.S. Appl. No. 11/071,234 to Uenaka, which was filed on Mar. 4, 2005.
U.S. Appl. No. 11/071,220 to Uenaka et al., which was filed on Mar. 4, 2005.
U.S. Appl. No. 11/071,241 to Uenaka, which was filed on Mar. 4, 2005.
U.S. Appl. No. 11/071,354 to Uenaka, which was filed on Feb. 25, 2005.
U.S. Appl. No. 11/078,367 to SEO, which was filed on Mar. 14, 2005.
English Language Abstract of JP 2002-229090.
English Language Abstract of JP 2003-110919.
English Language Abstract of JP 10-142647.
U.S. Appl. No. 11/065,354, filed on Feb. 25, 2005, Uenaka.

* cited by examiner

ANTI-SHAKE APPARATUS

BACKGROUND OF THE INVENTION

1. Field of the Invention

The present invention relates to an anti-shake apparatus for a photographing device (apparatus), and in particular to a position-detecting apparatus for a movable unit that includes the imaging device etc., and that can be moved for correcting the hand-shake effect.

2. Description of the Related Art

An anti-shake apparatus for a photographing apparatus is proposed. The anti-shake apparatus corrects for the hand-shake effect by moving a hand-shake correcting lens or an imaging device on a plane that is perpendicular to the optical axis, corresponding to the amount of hand-shake which occurs during imaging.

Japanese unexamined patent publication (KOKAI) No. 2002-229090 discloses an anti-shake apparatus for a photographing apparatus. The anti-shake apparatus performs a moving operation of a movable unit, which includes a hand-shake correcting lens, by using a permanent magnet and a coil, and a position-detecting operation of the movable unit, by using a hall element and a permanent magnet.

However, an adjustment operation for an accurate position-detecting operation corresponding to the change of the focal distance, such as when using a zoom lens etc., is not performed.

SUMMARY OF THE INVENTION

Therefore, an object of the present invention is to provide an apparatus that performs an adjustment operation for an accurate position-detecting operation corresponding to the change of the focal distance.

According to the present invention, an anti-shake apparatus of a photographing apparatus comprises a movable unit, a fixed unit, a signal-processing unit, and a control unit.

The movable unit has one of an imaging device and a hand-shake correcting lens, and can be moved in first and second directions. The first direction is perpendicular to an optical axis of a camera lens of the photographing apparatus. The second direction is perpendicular to the optical axis and the first direction.

The fixed unit slidably supports the movable unit in both the first and second directions.

The control unit controls the movable unit, the fixed unit, and the signal-processing unit, and has first and second A/D converters.

One of the movable unit and the fixed unit has a magnetic-field change-detecting unit which has a horizontal magnetic-field change-detecting element for detecting a position of the movable unit in the first direction, as a first location, and a vertical magnetic-field change-detecting element for detecting a position of the movable unit in the second direction, as a second location.

Another of the movable unit and the fixed unit has a position-detecting magnet unit which is used for detecting the first and second locations, and which faces the magnetic-field change-detecting unit.

The signal-processing unit outputs a first detected-position signal which specifies the first location on the basis of output signals of the horizontal magnetic-field change-detecting element, to the first A/D converter, and outputs a second detected-position signal which specifies the second location on the basis of output signals of the vertical magnetic-field change-detecting element, to the second A/D converter.

The control unit calculates the first location on the basis of an A/D converting operation by the first A/D converter, for the first detected-position signal, and calculates the second location on the basis of an A/D converting operation by the second A/D converter, for the second detected-position signal. The control unit also performs an adjusting operation which maximizes a width between minimum and maximum values of the first detected-position signal, in a horizontal movement range of the movable unit, and in an A/D converting range of the first A/D converter, and maximizes a width between minimum and maximum values of the second detected-position signal, in a vertical movement range of the movable unit, and in an A/D converting range of the second A/D converter.

The horizontal movement range is proportional to a focal distance of the camera lens.

The vertical movement range is proportional to the focal distance.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
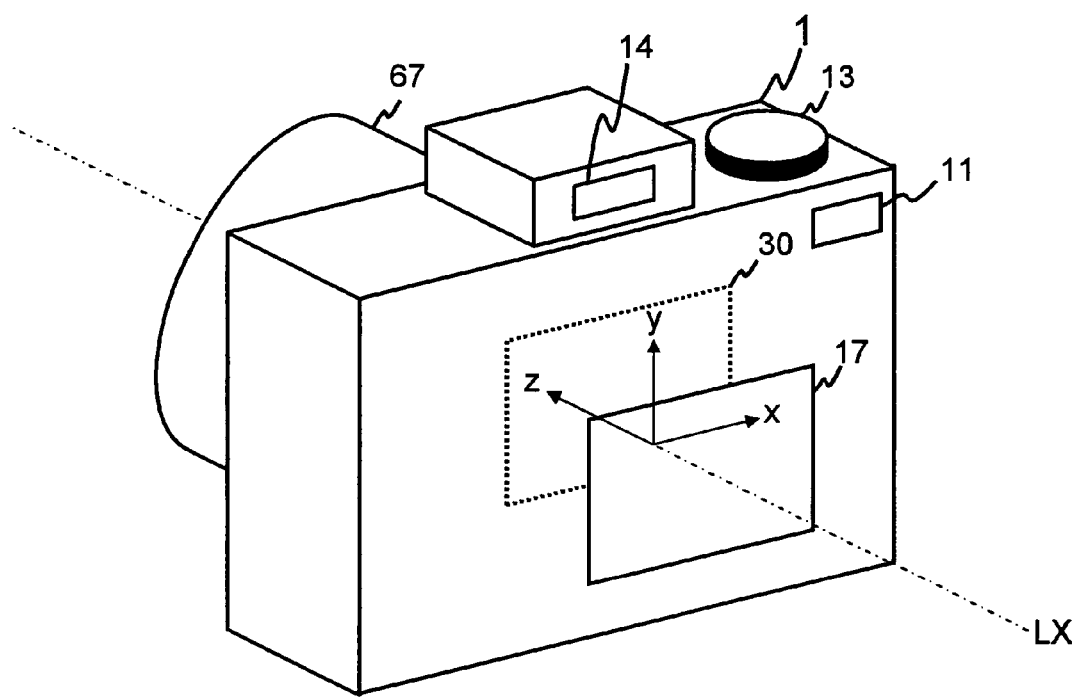
FIG. 1 is a perspective view of a photographing apparatus viewed from the back side of the photographing apparatus.

The present invention is described below with reference to the embodiment shown in the drawings. In this embodiment, the photographing apparatus 1 is a digital camera. The photographing apparatus 1 has an optical axis LX.

In order to explain the direction in these embodiments, a first direction x, a second direction y, and a third direction z are defined (see FIG. 1). The first direction x is a horizontal direction which is perpendicular to the optical axis LX. The second direction y is a vertical direction which is perpendicular to the optical axis LX and the first direction x. The third direction z is a horizontal direction which is parallel to the optical axis LX and perpendicular to both the first direction x and the second direction y.

Figure 4:
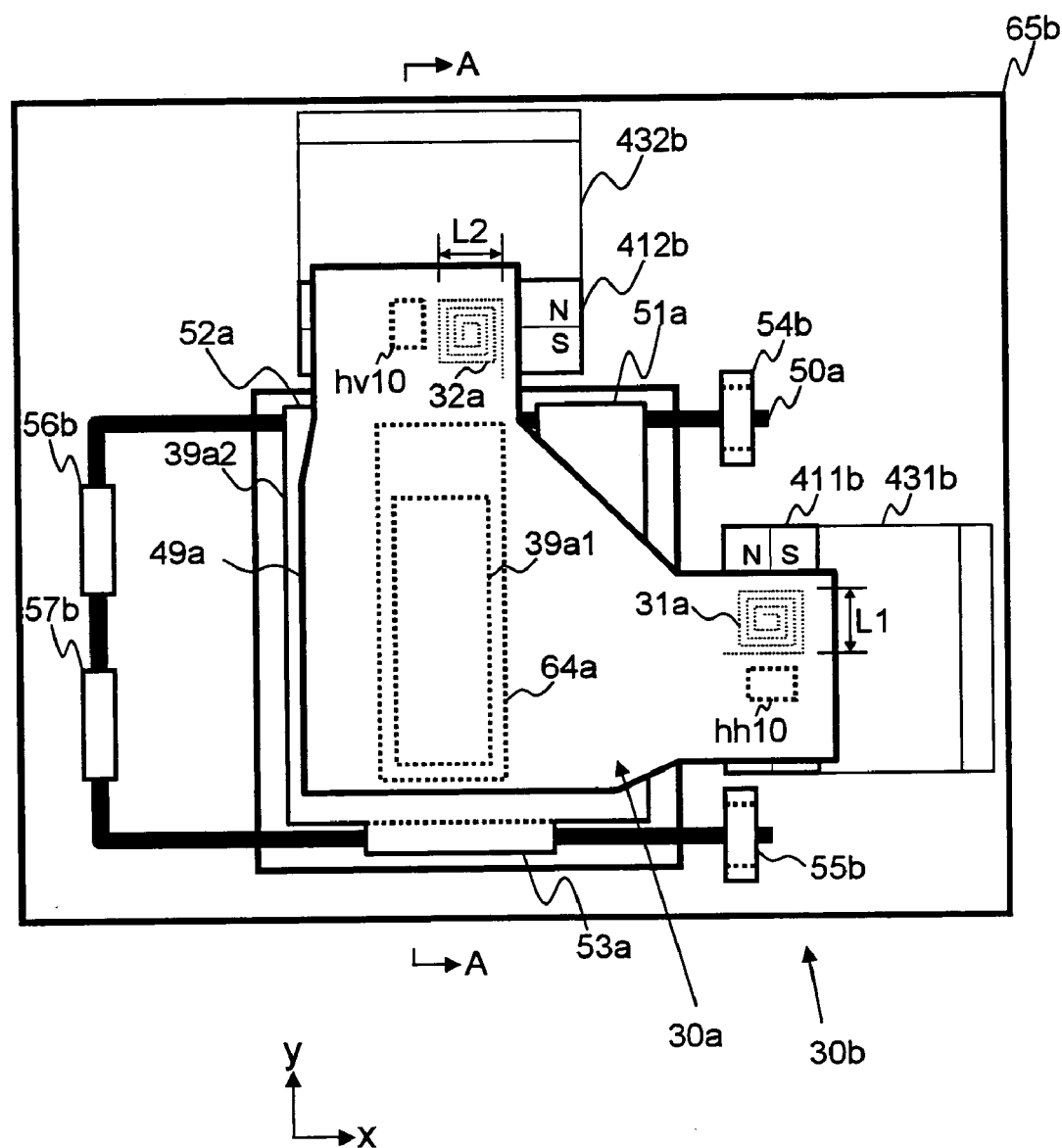
FIG. 4 is a figure showing the construction of the anti-shake unit.
Figure 5:
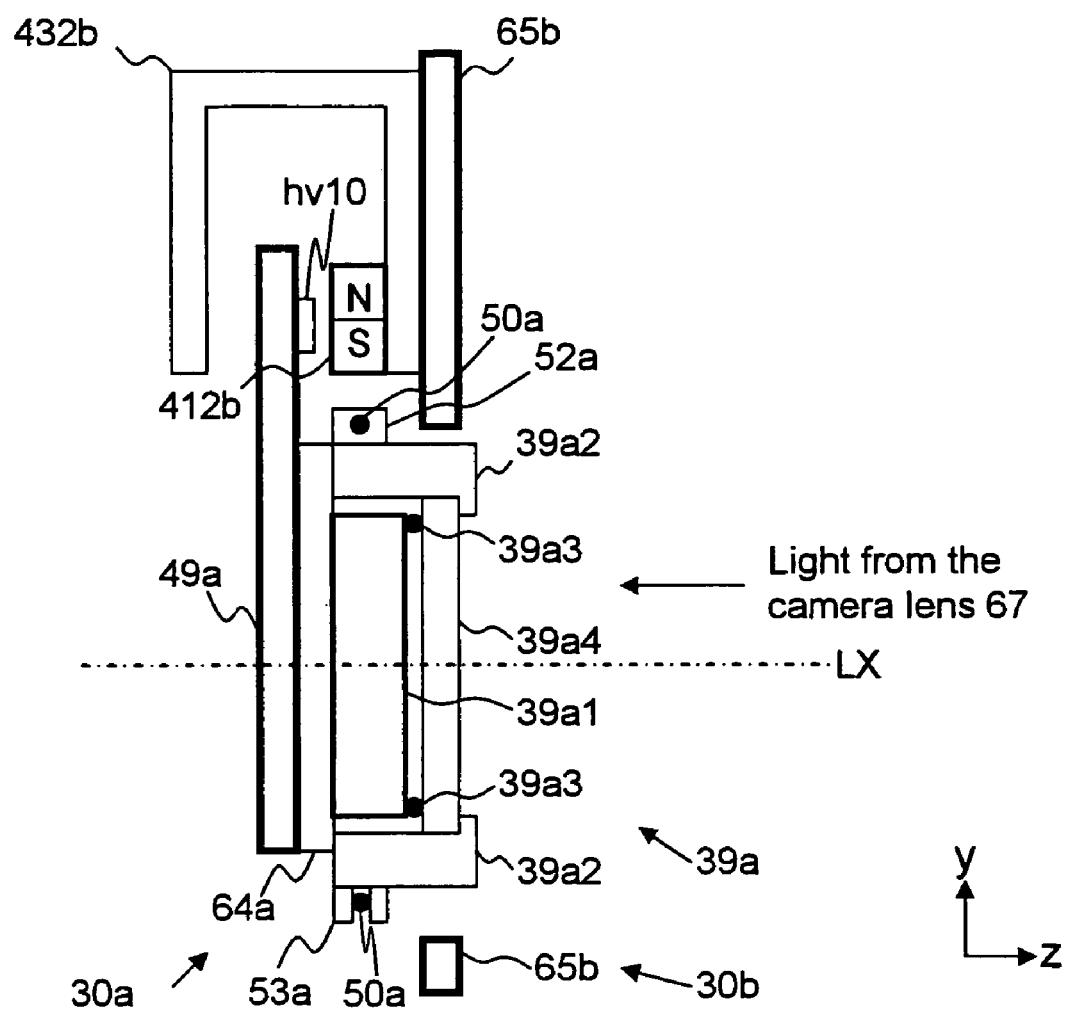
FIG. 5 is a view along line A—A of FIG. 4.

FIG. 5 shows a construction diagram of the section along line A—A of FIG. 4.

Figure 2:
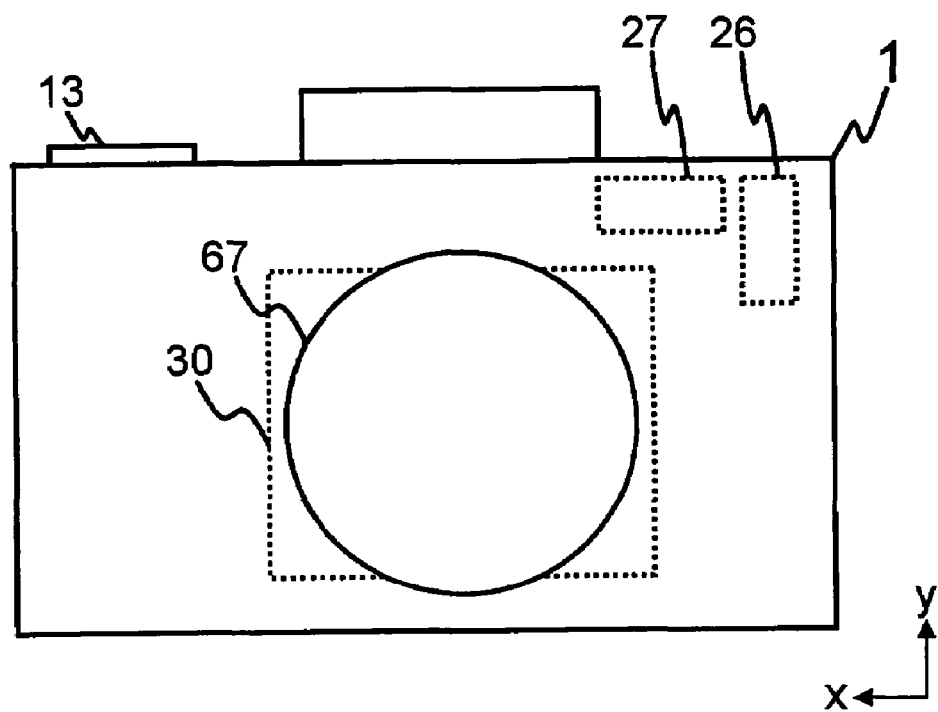
FIG. 2 is a front view of the photographing apparatus.
Figure 3:
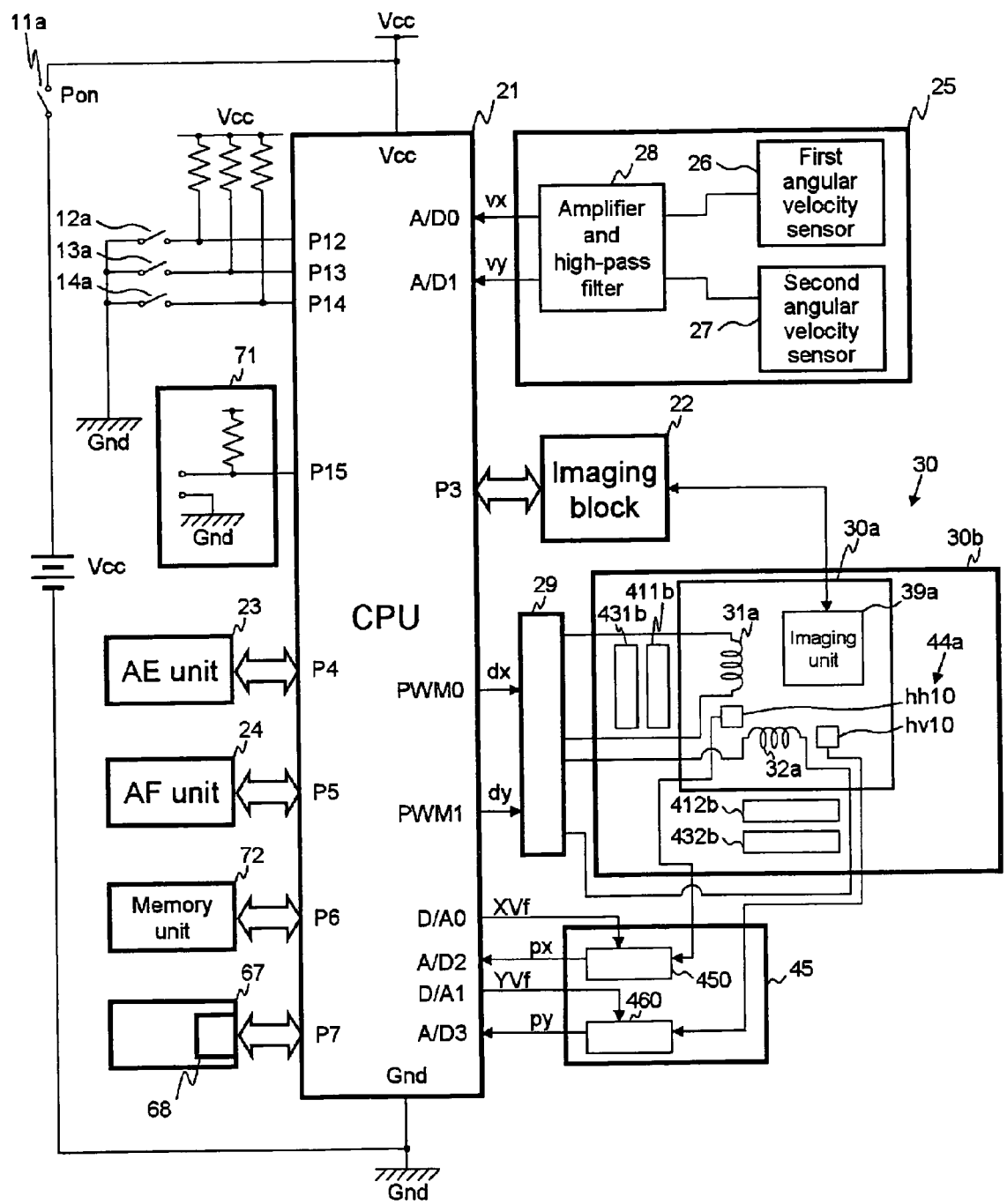
FIG. 3 is a circuit construction diagram of the photographing apparatus.

The imaging part of the photographing apparatus 1 comprises a Pon button 11, a Pon switch 11a, a photometric switch 12a, a release button 13, a release switch 13a, an indicating unit 17 such as an LCD monitor, a CPU 21, an imaging block 22, an AE (automatic exposure) unit 23, an AF (automatic focusing) unit 24, an imaging unit 39a in the anti-shake unit 30, and a camera lens 67 (see FIGS. 1, 2, and 3).

Whether the Pon switch 11a is in the on state or the off state, is determined by a state of the Pon button 11, so that the ON/OFF states of the photographing apparatus 1 are changed corresponding to the ON/OFF states of the Pon switch 11a.

The photographic subject image is taken as an optical image through the camera lens 67 by the imaging block 22, which drives the imaging unit 39a, so that the image, which is taken, is indicated on the indicating unit 17. The photographic subject image can be optically observed by the optical finder (not depicted).

When the release button 13 is half pushed by the operator, the photometric switch 12a changes to the on state, so that the photometric operation, the AF sensing operation, and the focusing operation are performed.

When the release button 13 is fully pushed by the operator, the release switch 13a changes to the on state, so that the imaging operation is performed, and the image, which is taken, is stored.

The CPU 21 is a control apparatus, which controls each part of the photographing apparatus 1 regarding the imaging operation, and controls each part of the photographing apparatus 1 regarding the anti-shake operation. The anti-shake operation controls the movement of the movable unit 30a and controls detecting the position of the movable unit 30a.

The imaging block 22 drives the imaging unit 39a. The AE unit 23 performs the photometric operation for the photographic subject, calculates the photometric values, and calculates the aperture value and the time length of the exposure time, which is needed for imaging, corresponding to the photometric values. The AF unit 24 performs the AF sensing operation, and performs the focusing operation, which is needed for the imaging, corresponding to the result of the AF sensing operation. In the focusing operation, the position of the camera lens 67 is moved in the optical axis LX direction.

The anti-shaking part of the photographing apparatus 1 comprises an anti-shake button 14, an anti-shake switch 14a, a CPU 21, an angular velocity detecting unit 25, a driver circuit 29, an anti-shake unit 30, a hall-element signal-processing unit 45, the camera lens 67, a adjusting unit 71, and a memory unit 72.

When the anti-shake button 14 is fully pushed by the operator, the anti-shake switch 14a changes to the on state, so that the anti-shake operation is performed where the angular velocity detecting unit 25 and the anti-shake unit 30 are driven, at every predetermined time interval, independently of the other operations which include the photometric operation etc. When the anti-shake switch 14a is in the on state, in other words in the anti-shake mode, the parameter IS is set to 1 (IS=1). When the anti-shake switch 14a is not in the on state, in other words in the non anti-shake mode, the parameter IS is set to 0 (IS=0). In this embodiment, the predetermined time interval is 1 ms.

The various output commands corresponding to the input signals of these switches are controlled by the CPU 21.

The information regarding whether the photometric switch 12a is in the on state or in the off state, is input to port P12 of the CPU 21 as a 1-bit digital signal. The information regarding whether the release switch 13a is in the on state or in the off state, is input to port P13 of the CPU 21 as a 1-bit digital signal. The information regarding whether the anti-shake switch 14a is in the on state or in the off state, is input to port P14 of the CPU 21 as a 1-bit digital signal.

The imaging block 22 is connected to port P3 of the CPU 21 for inputting and outputting signals. The AE unit 23 is connected to port P4 of the CPU 21 for inputting and outputting signals. The AF unit 24 is connected to port P5 of the CPU 21 for inputting and outputting signals.

The camera lens 67 is a lens whose focal distance can be changed, such as a zoom lens. In this embodiment, the camera lens 67 has a first focal distance F1 and a second focal distance F2.

The first focal distance F1 is the longest focal distance in the changeable focal distance of the camera lens 67. The value of the first focal distance F1 is used for the first and second initial-adjustment operations which are described later.

The second focal distance F2 is a focal distance which is optionally chosen by the operator, and which is in the changeable focal distance of the camera lens 67.

Information regarding the value of the second focal distance F2 is input to port P7 of the CPU 21, through a lens-position detecting apparatus 68 of the camera lens 67 such as a code board or an encoder etc.

In the case where the first focal distance F1 is set to the longest focal distance in the changeable focal distance range of the camera lens 67, as in this embodiment, the chance of error is minimized due to optimizing the detecting-resolution corresponding to the length of the focal distance, on the basis of the result of the first and second initial-adjustment operations.

The adjusting unit 71 is a mode switch for switching between a normal use mode and an adjusting mode.

In the adjusting mode, an initial-adjustment operation is performed, which adjusts a detecting-resolution in the A/D converting operation for the first and second detected-position signals px and py, which are analogue signals and are obtained when detecting the position of the movable unit 30a using the hall element unit 44a. The initial-adjustment operation has first and second initial-adjustment operations, which are described later.

When the mode switch is set to the on state, the photographing apparatus 1 is set in the adjusting mode. When the mode switch is set to the off state, the adjusting mode is canceled and the photographing apparatus 1 is set in the normal use mode.

The memory unit 72 is a non-volatile memory, such as an EEPROM etc., which stores the first-optimized horizontal hall-element current-value xsDi1 and the first-optimized vertical hall-element current-value ysDi1. The memory unit 72 is electrically rewritable, so that a content, which is stored in the memory unit 72, is not deleted even if the memory unit 72 is set to the off state.

The adjusting unit 71 is connected to port P15 of the CPU 21 for inputting and outputting signals. When the Lo signal is output from the adjusting unit 71 to the port P15 of the CPU 21, the initial-adjustment operation (the first and second initial-adjustment operations) is performed. The memory unit 72 is connected to port P6 of the CPU 21 for inputting and outputting signals.

Next, the details of the input and output relationship with the CPU 21 for the angular velocity unit 25, the driver circuit 29, the anti-shake unit 30, and the hall-element signal-processing unit 45 are explained.

The angular velocity unit 25 has a first angular velocity sensor 26, a second angular velocity sensor 27, and a combined amplifier and high-pass filter circuit 28. The first angular velocity sensor 26 detects the velocity-component in the first direction x of the angular velocity of the photographing apparatus 1, at every predetermined time interval (1 ms). The second angular velocity sensor 27 detects the velocity-component in the second direction y of the angular velocity of the photographing apparatus 1, at every predetermined time interval (1 ms).

The combined amplifier and high-pass filter circuit 28 amplifies the signal regarding the first direction x of the angular velocity (the velocity-component in the first direction x of the angular velocity), reduces a null voltage and a panning of the first angular velocity sensor 26, and outputs the analogue signal to the A/D converter A/D 0 of the CPU 21 as a first angular velocity vx.

The combined amplifier and high-pass filter circuit 28 amplifies the signal regarding the second direction y of the angular velocity (the velocity-component in the second direction y of the angular velocity), reduces a null voltage and a panning of the second angular velocity sensor 27, and outputs the analogue signal to the A/D converter A/D 1 of the CPU 21 as a second angular velocity vy.

The CPU 21 converts the first angular velocity vx which is input to the A/D converter A/D 0 and the second angular velocity vy which is input to the A/D converter A/D 1 to digital signals (A/D converting operation), and calculates the hand-shake quantity, which occurs in the predetermined time (1 ms), on the basis of the converted digital signals and the converting coefficient, where focal distance is considered. Accordingly, the CPU 21 and the angular velocity detecting unit 25 have a function which calculates the hand-shake quantity.

The CPU 21 calculates the position S of the imaging unit 39a (the movable unit 30a), which should be moved to, corresponding to the hand-shake quantity which is calculated, for the first direction x and the second direction y. The location in the first direction x of the position S is defined as sx, and the location in the second direction y of the position S is defined as sy. The movement of the movable unit 30a, which includes the imaging unit 39a, is performed by using electro-magnetic force and is described later. The driving force D, which drives the driver circuit 29 in order to move the movable unit 30a to the position S, has a first PWM duty dx as the driving-force component in the first direction x, and a second PWM duty dy as the driving-force component in the second direction y.

The anti-shake unit 30 is an apparatus which corrects the hand-shake effect, by moving the imaging unit 39a to the position S, by canceling lag of the photographic subject image on the imaging surface of the imaging device 39a1, and by stabilizing the photographing subject image that reaches the imaging surface of the imaging device 39a1.

The anti-shake unit 30 has a movable unit 30a, which includes the imaging unit 39a, and a fixed unit 30b. Or, the anti-shake unit 30 is composed of a driving part which moves the movable unit 30a by electromagnetic force to the position S, and a position-detecting part which detects the position of the movable unit 30a (a detected-position P).

The size and the direction of the electro-magnetic force are determined by the size and the direction of the current which flows in the coil, and the size and the direction of the magnetic-field of the magnet.

The driving of the movable unit 30a of the anti-shake unit 30, is performed by the driver circuit 29 which has the first PWM duty dx input from the PWM 0 of the CPU 21 and has the second PWM duty dy input from the PWM 1 of the CPU 21. The detected-position P of the movable unit 30a either before moving or after moving, which is moved by driving the driver circuit 29, is detected by the hall element unit 44a and the hall-element signal-processing unit 45.

Information of a first location in the first direction x for the detected-position P, in other words a first detected-position signal px is input to the A/D converter A/D 2 of the CPU 21. The first detected-position signal px is an analogue signal, and is converted to a digital signal through the A/D converter A/D 2 (A/D converting operation). The first location in the first direction x for the detected-position P, after the A/D converting operation, is defined as pdx, corresponding to the first detected-position signal px.

Information of a second location in the second direction y for the detected-position P, in other words a second detected-position signal py is input to the A/D converter A/D 3 of the CPU 21. The second detected-position signal py is an analogue signal, and is converted to a digital signal through the A/D converter A/D 3 (A/D converting operation). The second location in the second direction y for the detected-position P, after the A/D converting operation, is defined as pdy, corresponding to the second detected-position signal py.

The PID (Proportional Integral Differential) control is performed on the basis of the data for the detected-position P (pdx, pdy) and the data for the position S (sx, sy) which should be moved to.

The movable unit 30a has a first driving coil 31a, a second driving coil 32a, an imaging unit 39a, a hall element unit 44a, a movable circuit board 49a, a shaft for movement 50a, a first bearing unit for horizontal movement 51a, a second bearing unit for horizontal movement 52a, a third bearing unit for horizontal movement 53a, and a plate 64a (see FIGS. 4 and 5).

The fixed unit 30b has a position-detecting magnet unit, a first position-detecting and driving yoke 431b, a second position-detecting and driving yoke 432b, a first bearing unit for vertical movement 54b, a second bearing unit for vertical movement 55b, a third bearing unit for vertical movement

56b, a fourth bearing unit for vertical movement 57b, and a base board 65b. The position-detecting magnet unit has a first position-detecting and driving magnet 411b and a second position-detecting and driving magnet 412b.

The shaft for movement 50a of the movable unit 30a has a channel shape when viewed from the third direction z. The first, second, third, and fourth bearing units for vertical movement 54b, 55b, 56b, and 57b are attached to the base board 65b of the fixed unit 30b. The shaft for movement 50a is slidably supported in the vertical direction (the second direction y), by the first, second, third, and fourth bearing units for vertical movement 54b, 55b, 56b, and 57b.

The first and second bearing units for vertical movement 54b and 55b have slots which extend in the second direction y.

Therefore, the movable unit 30a can move relative to the fixed unit 30b, in the vertical direction (the second direction y).

The shaft for movement 50a is slidably supported in the horizontal direction (the first direction x), by the first, second, and third bearing units for horizontal movement 51a, 52a, and 53a of the movable unit 30a. Therefore, the movable unit 30a, except for the shaft for movement 50a, can move relative to the fixed unit 30b and the shaft for movement 50a, in the horizontal direction (the first direction x).

The movement range of the movable unit 30a means the movement range of the center of the movable unit 30a. A reasonable movement range of the movable unit 30a is changed corresponding to the focal distance of the camera lens 67.

Figure 6:
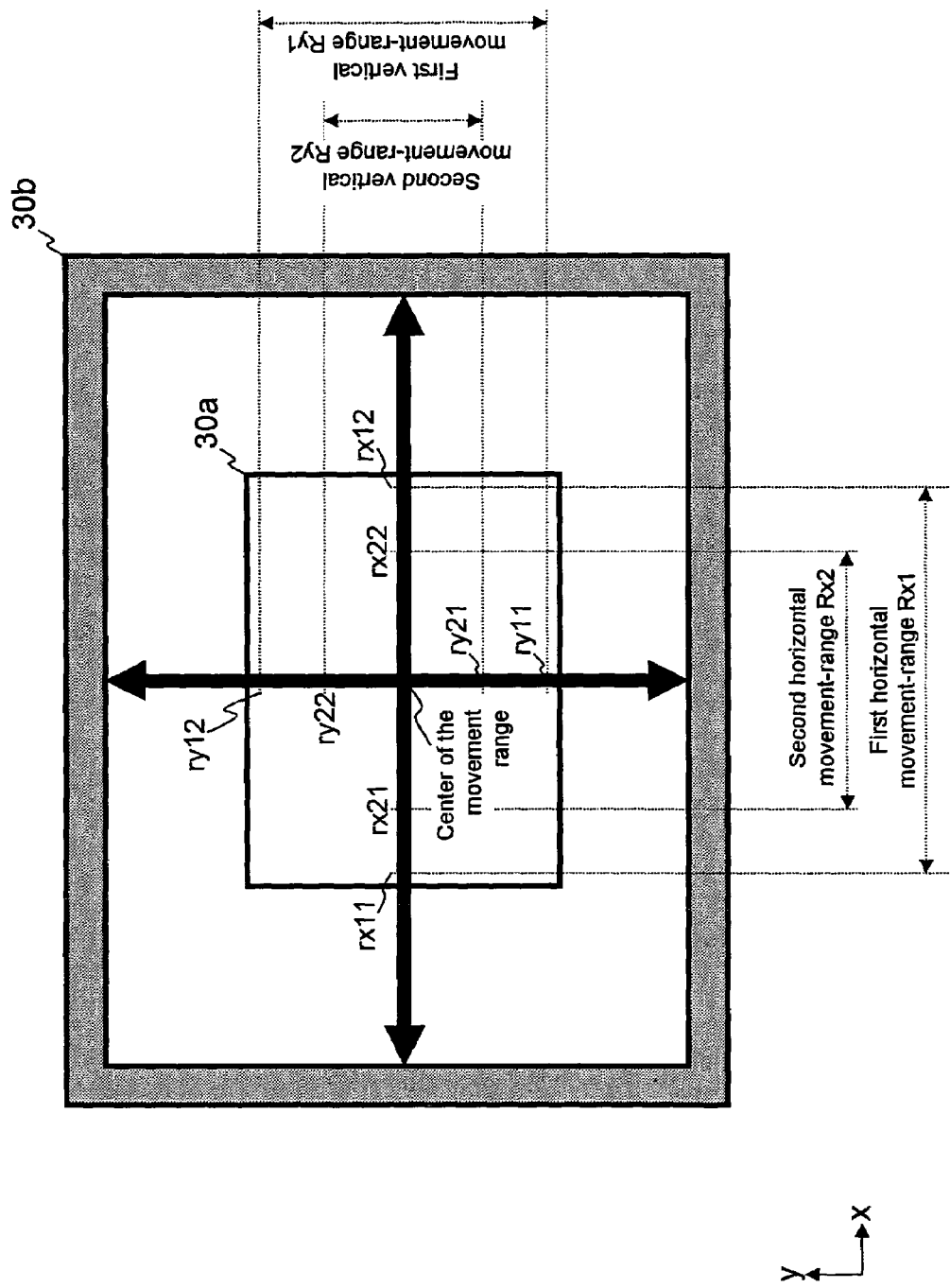
FIG. 6 is a plane view showing a movement range of the movable unit.

When the focal distance of the camera lens 67 is set to the first focal distance F1, a reasonable movement range of the movable unit 30a in the first direction x, is a first horizontal movement-range Rx1, and a reasonable movement range of the movable unit 30a in the second direction y, is a first vertical movement-range Ry1 (see FIG. 6).

The first horizontal movement-range Rx1 is a maximum movement range of the movable unit 30a in the first direction x. The value of the first horizontal movement-range Rx1 is fixed.

The first vertical movement-range Ry1 is a maximum movement range of the movable unit 30a in the second direction y. The value of the first vertical movement-range Ry1 is fixed.

In FIG. 6, the forms of the movable unit 30a and the fixed unit 30b are simplified.

When the focal distance of the camera lens 67 is set to the second focal distance F2, the acceptable movement range of the movable unit 30a in the first direction x, is a second horizontal movement-range Rx2, and the acceptable movement range of the movable unit 30a in the second direction y, is a second vertical movement-range Ry2.

The second horizontal movement-range Rx2 is a movement range of the movable unit 30a in the first direction x, which is changeable and is proportional to the focal distance of the camera lens 67, the focal length being controllable by the operator. The value of the second horizontal movement-range Rx2 is less than or equal to the value of the first horizontal movement-range Rx1.

The second vertical movement-range Ry2 is a movement range of the movable unit 30a in the second direction y, which is changeable and is proportional to the focal distance of the camera lens 67, the focal length being controllable by the operator. The value of the second vertical movement-range Ry2 is less than or equal to the value of the first vertical movement-range Ry1.

The hand-shake usually causes movement of the camera lens within an angle range which has been shown to be ±0.7°.

The value of the second horizontal movement-range Rx2 is determined by multiplying the value of the second focal distance F2 by the known angle range 2×tan(0.7°). Similarly, the value of the second vertical movement-range Ry2 is determined by multiplying the value of the second focal distance F2 by the known value 2×tan(0.7°).

One of the edge points in the first horizontal movement-range Rx1 is a first horizontal edge-point rx11, another of the edge points in the first horizontal movement-range Rx1 is a second horizontal edge-point rx12, one of the edge points in the first vertical movement-range Ry1 is a first vertical edge-point ry11, and another of the edge points in the first vertical movement-range Ry1 is a second vertical edge-point ry12 (see FIG. 6).

One of the edge points in the second horizontal movement-range Rx2 is a third horizontal edge-point rx21, another of the edge points in the second horizontal movement-range Rx2 is a fourth horizontal edge-point rx22, one of the edge points in the second vertical movement-range Ry2 is a third vertical edge-point ry21, and another of the edge points in the second vertical movement-range Ry2 is a fourth vertical edge-point ry22 (see FIG. 6).

When the center area of the imaging device 39a1 is located on the optical axis LX of the camera lens 67, the location relation between the movable unit 30a and the fixed unit 30b is set up so that the movable unit 30a is located at the center of its movement range in both the first direction x and the second direction y, in order to utilize the full size of the imaging range of the imaging device 39a1.

A rectangle shape, which forms the imaging surface of the imaging device 39a1, has two diagonal lines. In this embodiment, the center of the imaging device 39a1 is the crossing point of these two diagonal lines.

The imaging unit 39a, the plate 64a, and the movable circuit board 49a are attached, in this order along the optical axis LX direction, viewed from the side of the camera lens 67. The imaging unit 39a has an imaging device 39a1 (such as a CCD or a COMS etc.), a stage 39a2, a holding unit 39a3, and an optical low-pass filter 39a4. The stage 39a2 and the plate 64a hold and urge the imaging device 39a1, the holding unit 39a3, and the optical low-pass filter 39a4 in the optical axis LX direction.

The first, second, and third bearing units for horizontal movement 51a, 52a, and 53a are attached to the stage 39a2. The imaging device 39a1 is attached to the plate 64a, so that positioning of the imaging device 39a1 is performed where the imaging device 39a1 is perpendicular to the optical axis LX of the camera lens 67. In the case where the plate 64a is made of a metallic material, the plate 64a has the effect of radiating heat from the imaging device 39a1, by contacting the imaging device 39a1.

The first driving coil 31a, the second driving coil 32a, and the hall element unit 44a are attached to the movable circuit board 49a.

The first driving coil 31a forms a seat and a spiral shape coil pattern. The coil pattern of the first driving coil 31a has lines which are parallel to either the first direction x or the second direction y, where the movable unit 30a which includes the first driving coil 31a, is moved in the first direction x, by the first electro-magnetic force. The lines which are parallel to the second direction y, are used for moving the movable unit 30a in the first direction x. The lines which are parallel to the second direction y, have a first effective length L1.

The first electro-magnetic force occurs on the basis of the current direction of the first driving coil 31a and the magnetic-field direction of the first position-detecting and driving magnet 411b.

The second driving coil 32a forms a seat and a spiral shape coil pattern. The coil pattern of the second driving coil 32a has lines which are parallel to either the first direction x or the second direction y, where the movable unit 30a which includes the second driving coil 32a, is moved in the second direction y, by the second electromagnetic force. The lines which are parallel to the first direction x, are used for moving the movable unit 30a in the second direction y. The lines which are parallel to the first direction x, have a second effective length L2.

The second electromagnetic force occurs on the basis of the current direction of the second driving coil 32a and the magnetic-field direction of the second position-detecting and driving magnet 412b.

The first and second driving coils 31a and 32a are connected with the driver circuit 29 which drives the first and second driving coils 31a and 32a through the flexible circuit board (not depicted). The first PWM duty dx is input to the driver circuit 29 from the PWM 0 of the CPU 21, and the second PWM duty dy is input to the driver circuit 29 from the PWM 1 of the CPU 21. The driver circuit 29 supplies power to the first driving coil 31a corresponding to the value of the first PWM duty dx, and to the second driving coil 32a corresponding to the value of the second PWM duty dy, to drive the movable unit 30a.

The first position-detecting and driving magnet 411b is attached to the movable unit side of the fixed unit 30b, where the first position-detecting and driving magnet 411b faces the first driving coil 31a and the horizontal hall element hh10 in the third direction z.

The second position-detecting and driving magnet 412b is attached to the movable unit side of the fixed unit 30b, where the second position-detecting and driving magnet 412b faces the second driving coil 32a and the vertical hall element hv10 in the third direction z.

The first position-detecting and driving magnet 411b is attached to the first position-detecting and driving yoke 431b, under the condition where the N pole and S pole are arranged in the first direction x. The first position-detecting and driving yoke 431b is attached to the base board 65b of the fixed unit 30b, on the side of the movable unit 30a, in the third direction z.

The length of the first position-detecting and driving magnet 411b in the second direction y, is longer in comparison with the first effective length L1 of the first driving coil 31a. The magnetic-field which influences the first driving coil 31a and the horizontal hall element hh10, is not changed during movement of the movable unit 30a in the second direction y.

The second position-detecting and driving magnet 412b is attached to the second position-detecting and driving yoke 432b, under the condition where the N pole and S pole are arranged in the second direction y. The second position-detecting and driving yoke 432b is attached to the base board 65b of the fixed unit 30b, on the side of the movable unit 30a, in the third direction z.

The length of the second position-detecting and driving magnet 412b in the first direction x, is longer in comparison with the second effective length L2 of the second driving coil 32a. The magnetic-field which influences the second driving coil 32a and the vertical hall element hv10, is not changed during movement of the movable unit 30a in the first direction x.

The first position-detecting and driving yoke 431b is made of a soft magnetic material, and forms a square-u-shape channel when viewed from the second direction y. The first position-detecting and driving magnet 411b, the first driving coil 31a, and the horizontal hall element hh10 are inside the channel of the first position-detecting and driving yoke 431b.

The side of the first position-detecting and driving yoke 431b, which contacts the first position-detecting and driving magnet 411b, prevents the magnetic-field of the first position-detecting and driving magnet 411b from leaking to the surroundings.

The other side of the first position-detecting and driving yoke 431b (which faces the first position-detecting and driving magnet 411b, the first driving coil 31a, and the movable circuit board 49a) raises the magnetic-flux density between the first position-detecting and driving magnet 411b and the first driving coil 31a, and between the first position-detecting and driving magnet 411b and the horizontal hall element hh10.

The second position-detecting and driving yoke 432b is made of a soft magnetic material, and forms a square-u-shape channel when viewed from the first direction x. The second position-detecting and driving magnet 412b, the second driving coil 32a, and the vertical hall element hv10 are inside the channel of the second position-detecting and driving yoke 432b.

The side of the second position-detecting and driving yoke 432b, which contacts the second position-detecting and driving magnet 412b, prevents the magnetic-field of the second position-detecting and driving magnet 412b from leaking to the surroundings.

The other side of the second position-detecting and driving yoke 432b (which faces the second position-detecting and driving magnet 412b, the second driving coil 32a, and the movable circuit board 49a) raises the magnetic-flux density between the second position-detecting and driving magnet 412b and the second driving coil 32a, and between the second position-detecting and driving magnet 412b and the vertical hall element hv10.

The hall element unit 44a is a one-axis hall element which has two hall elements that are magnetoelectric converting elements (magnetic-field change-detecting elements) using the Hall Effect. The hall element unit 44a detects the first detected-position signal px which is used for specifying the first location in the first direction x for the present position P of the movable unit 30a, and the second detected-position signal py which is used for specifying the second location in the second direction y for the present position P of the movable unit 30a.

One of the two hall elements is a horizontal hall element hh10 for detecting the first location in the first direction x of the movable unit 30a, so that the other is a vertical hall element hv10 for detecting the second location in the second direction y of the movable unit 30a (see FIG. 4).

The horizontal hall element hh10 is attached to the movable circuit board 49a of the movable unit 30a, under the condition where the horizontal hall element hh10 faces the first position-detecting and driving magnet 411b of the fixed unit 30b, in the third direction z.

The vertical hall element hv10 is attached to the movable circuit board 49a of the movable unit 30a, under the condition where the vertical hall element hv10 faces the second position-detecting and driving magnet 412b of the fixed unit 30b, in the third direction z.

The base board 65b is a plate state member which becomes the base for attaching the first position-detecting and driving yoke 431b etc., and is arranged being parallel to the imaging surface of the imaging device 39a1.

In this embodiment, the base board 65b is arranged at the side nearer to the camera lens 67 in comparison with the movable circuit board 49a, in the third direction z. However, the movable circuit board 49a may be arranged at the side nearer to the camera lens 67 in comparison with the base board 65b. In this case, the first and second driving coils 31a and 32a, and the hall element unit 44a are arranged on the opposite side of the movable circuit board 49a to the camera lens 67, so that the first and second position-detecting and driving magnets 411b and 412b are arranged on the same side of the base board 65b as the camera lens 67.

The hall-element signal-processing unit 45 has a first hall-element signal-processing circuit 450 and a second hall-element signal-processing circuit 460.

The first hall-element signal-processing circuit 450 detects a horizontal potential-difference x10 between output terminals of the horizontal hall element hh10, based on an output signal of the horizontal hall element hh10.

The first hall-element signal-processing circuit 450 outputs the first detected-position signal px, which specifies the first location in the first direction x of the movable unit 30a, to the A/D converter A/D 2 of the CPU 21, on the basis of the horizontal potential-difference x10.

The second hall-element signal-processing circuit 460 detects a vertical potential-difference y10 between output terminals of the vertical hall element hv10, based on an output signal of the vertical hall element hv10.

The second hall-element signal-processing circuit 460 outputs the second detected-position signal py, which specifies the second location in the second direction y of the movable unit 30a, to the A/D converter A/D 3 of the CPU 21, on the basis of the vertical potential-difference y10.

In the first initial-adjustment operation, a first detecting-resolution of the A/D converter A/D 2 for A/D converting the first detected-position signal px, when the focal distance of the camera lens 67 is set to the first focal distance F1, is adjusted and improved. Or, the width between the minimum and maximum values of the first detected-position signal px is maximized, in the movement range of the movable unit 30a (the first horizontal movement-range Rx1), and in the A/D converting range of the CPU 21.

In the second initial-adjustment operation, a second detecting-resolution of the A/D converter A/D 3 for A/D converting the second detected-position signal py, when the focal distance of the camera lens 67 is set to the first focal distance F1, is adjusted and improved. Or, the width between the minimum and maximum values of the second detected-position signal py is maximized, in the movement range of the movable unit 30a (the first vertical movement-range Ry1), and in the A/D converting range of the CPU 21.

Current having the first optimized horizontal hall-element current-value xsDi1, which flows through the input terminals of the horizontal hall element hh10 when detecting the first location in the first direction x of the movable unit 30a, when the focal distance of the camera lens 67 is set to the first focal distance F1, is determined by the first initial-adjustment operation.

Current having the first optimized vertical hall-element current-value ysDi1, which flows through the input terminals of the vertical hall element hv10 when detecting the second location in the second direction y of the movable unit 30a, when the focal distance of the camera lens 67 is set to the first focal distance F1, is determined by the second initial-adjustment operation.

Current having the second optimized horizontal hall-element current-value xsDi2, which flows through the input terminals of the horizontal hall element hh10 when detecting the first location in the first direction x of the movable unit 30a, when the focal distance of the camera lens 67 is set to the second focal distance F2, is determined by multiplying the first optimized horizontal hall-element current-value xsDi1 by a coefficient value obtained on the basis of the values of the first and second focal distances F1 and F2.

Current having the second optimized vertical hall-element current-value ysDi2, which flows through the input terminals of the vertical hall element hv10 when detecting the second location in the second direction y of the movable unit 30a, when the focal distance of the camera lens 67 is set to the second focal distance F2, is determined by multiplying the first optimized vertical hall-element current-value ysDi1 by a coefficient value obtained on the basis of the values of the first and second focal distances F1 and F2.

In this embodiment, the process which determines the second optimized horizontal hall-element current-value xsDi2 on the basis of the first optimized horizontal hall-element current-value xsDi1, and determines the second optimized vertical hall-element current-value ysDi2 on the basis of the first optimized vertical hall-element current-value ydDi1, is an adjustment-operation regarding the focal distance.

The first and second initial-adjustment operations are performed in the adjusting mode, where the Lo signal is output from the adjusting unit 71 to the port P15 of the CPU 21. The adjustment-operation regarding the focal distance is preformed at any time in the normal mode, where the adjusting mode is stopped.

A value of the current, which flows through the input terminals of the horizontal hall element hh10, is set to the second optimized hall-element current-value xsDi2, in the position detecting operation of the normal mode.

Similarly, a value of the current, which flows through the input terminals of the vertical hall element hv10, is set to the second optimized hall-element current-value ysDi2, in the position detecting operation of the normal mode.

Therefore, the first detecting-resolution and the second detecting-resolution are optimized corresponding to the focal distance of the camera lens 67.

Or, the width between the minimum and maximum values of the first detected-position signal px is maximized, in the movement range of the movable unit 30a (the second horizontal movement-range Rx2), and in the A/D converting range of the CPU 21. Similarly, the width between the minimum and maximum values of the second detected-position signal py is maximized, in the movement range of the movable unit 30a (the second vertical movement-range Ry2), and in the A/D converting range of the CPU 21.

Specifically, in the first initial-adjustment operation, first and second horizontal hall-element current-values xDi1 and xDi2 are calculated, so that the first optimized horizontal hall-element current-value xsDi1 which is the smaller value of the first and second horizontal hall-element current-values xDi1 and xDi2, is determined and stored in the memory unit 72.

The first horizontal hall-element current-value xDi1 is a value of the current which flows through the input terminals of the horizontal hall element hh10, when the output value of the first detected-position signal px becomes a maximum value in the A/D converting range of the CPU 21, and when the center of the movable unit 30a contacts the first horizontal edge-point rx11.

The second horizontal hall-element current-value xDi2 is a value of the current which flows through the input terminals of the horizontal hall element hh10, when the output value of the first detected-position signal px becomes a minimum value in the A/D converting range of the CPU 21, and when the center of the movable unit 30a contacts the second horizontal edge-point rx12.

Specifically, in the second initial-adjustment operation, first and second vertical hall-element current-values yDi1 and yDi2 are calculated, so that the first optimized vertical hall-element current-value ysDi1 which is the smaller value of the first and second vertical hall-element current-values yDi1 and yDi2, is determined and stored in the memory unit 72.

The first vertical hall-element current-value yDi1 is a value of the current which flows through the input terminals of the vertical hall element hv10, when the output value of the second detected-position signal py becomes a maximum value in the A/D converting range of the CPU 21, and when the center of the movable unit 30a contacts the first vertical edge-point ry11.

The second vertical hall-element current-value yDi2 is a value of the current which flows through the input terminals of the vertical hall element hv10, when the output value of the second detected-position signal py becomes a minimum value in the A/D converting range of the CPU 21, and when the center of the movable unit 30a contacts the second vertical edge-point ry12.

The first voltage XVf, corresponding to the second optimized horizontal hall-element current-value xsDi2, is applied to the circuit 456 of the hall-element signal-processing unit 45, from the D/A converter D/A 0 of the CPU 21.

The second voltage YVf, corresponding to the second optimized vertical hall-element current-value ysDi2, is applied to the circuit 466 of the hall-element signal-processing unit 45, from the D/A converter D/A 1 of the CPU 21.

Figure 7:
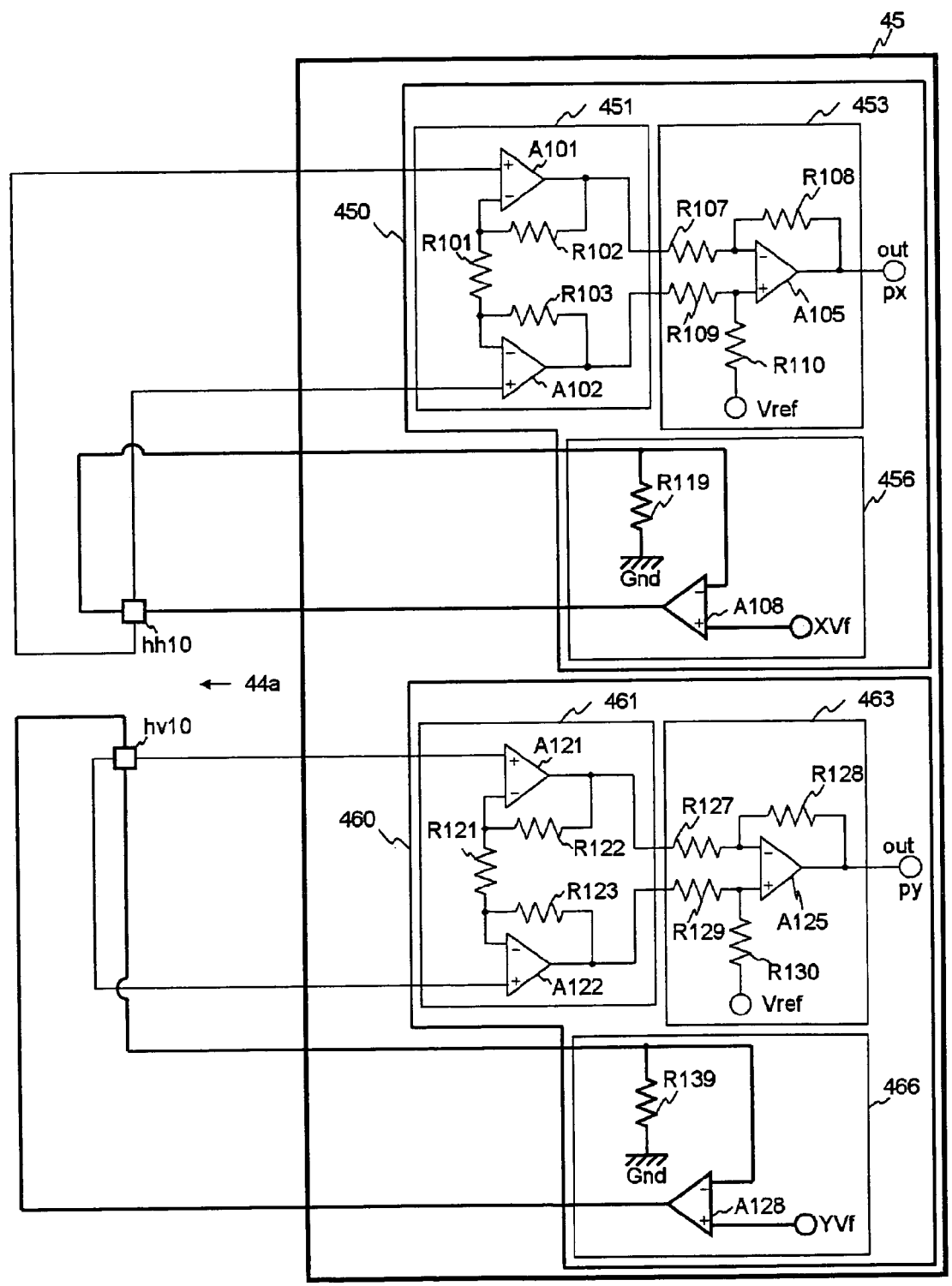
FIG. 7 is a circuit construction diagram of the circuit for the one-axis hall element and the hall-element signal-processing circuit.

The circuit construction regarding input/output signals of the horizontal hall element hh10, in the first hall-element signal-processing circuit 450 of the hall-element signal-processing unit 45, and the circuit construction regarding input/output signals of the vertical hall element hv10, in the second hall-element signal-processing circuit 460 of the hall-element signal-processing unit 45 are explained using FIG. 7.

The first hall-element signal-processing circuit 450 has a circuit 451 and a circuit 453 for controlling the output of the horizontal hall element hh10, and has a circuit 456 for controlling the input of the horizontal hall element hh10.

The second hall-element signal-processing circuit 460 has a circuit 461 and a circuit 463 for controlling the output of the vertical hall element hv10, and has a circuit 466 for controlling the input of the vertical hall element hv10.

Both output terminals of the horizontal hall element hh10 are connected with the circuit 451, so that the circuit 451 is connected with the circuit 453.

The circuit 451 is a differential amplifier circuit which amplifies the signal difference between the output terminals of the horizontal hall element hh10.

The circuit 453 is a subtracting amplifier circuit which calculates the horizontal potential-difference x10 (the hall output voltage) on the basis of the difference between the amplified signal difference from the circuit 451 and a reference voltage Vref, and which calculates the first detected-position signal px by multiplying a first amplification rate AA1 by the horizontal potential-difference x10.

The circuit 451 has a resistor R101, a resistor R102, a resistor R103, an operational amplifier A101, and an operational amplifier A102. The operational amplifier A101 has an inverting input terminal, a non-inverting input terminal, and an output terminal. The operational amplifier A102 has an inverting input terminal, a non-inverting input terminal, and an output terminal.

One of the output terminals of the horizontal hall element hh10 is connected with the non-inverting input terminal of the operational amplifier A101, so that the other terminal of the horizontal hall element hh10 is connected with the non-inverting input terminal of the operational amplifier A102.

The inverting input terminal of the operational amplifier A101 is connected with the resistors R101 and R102, so that the inverting input terminal of the operational amplifier A102 is connected with the resistors R101 and R103.

The output terminal of the operational amplifier A101 is connected with the resistor R102 and the resistor R107 in the circuit 453. The output terminal of the operational amplifier A102 is connected with the resistor R103 and the resistor R109 in the circuit 453.

The circuit 453 has a resistor R107, a resistor R108, a resistor R109, a resistor R110, and an operational amplifier A105. The operational amplifier A105 has an inverting input terminal, a non-inverting input terminal, and an output terminal.

The inverting input terminal of the operational amplifier A105 is connected with the resistors R107 and R108. The non-inverting input terminal of the operational amplifier A105 is connected with the resistors R109 and R110. The output terminal of the operational amplifier A105 is connected with the resistor R108. The first detected-position signal px, which is obtained by multiplying the first amplification rate AA1, by the horizontal potential-difference x10, is output from the output terminal of the operational amplifier A105. One of the terminals of the resistor R110 is connected with the power supply whose voltage is the reference voltage Vref.

The values of the resistors R102 and R103 are the same. The values of the resistors R107 and R109 are the same. The values of the resistors R108 and R110 are the same.

The first amplification rate AA1 is based on the values of the resistors R107~R110 (the ratio of the value of the resistor R107 to the value of the resistor R108).

The operational amplifiers A101 and A102 are the same type of amplifier.

The circuit 456 has a resistor R119 and an operational amplifier A108. The operational amplifier A108 has an inverting input terminal, a non-inverting input terminal, and an output terminal.

The inverting input terminal of the operational amplifier A108 is connected with the resistor R119 and one of the input terminals of the horizontal hall element hh10. The potential of the non-inverting input terminal of the operational amplifier A108 is set at the first voltage XVf corresponding to the current having the second optimized horizontal hall-element current-value xsDi2, that flows through the input terminals of the horizontal hall element hh10. The value of the first voltage XVf is obtained by multiplying the second optimized horizontal hall-element current-value xsDi2 by the value of the resistor R119.

Accordingly, the value of the first voltage XVf is a function of the second focal distance F2 of the camera lens 67.

The output terminal of the operational amplifier A108 is connected with the other input terminal of the horizontal hall element hh10. One of the terminals of the resistor R119 is grounded.

Both output terminals of the vertical hall element hv10 are connected with the circuit 461, so that the circuit 461 is connected with the circuit 463.

The circuit 461 is a differential amplifier circuit which amplifies the signal difference between the output terminals of the vertical hall element hv10.

The circuit 463 is a subtracting amplifier circuit which calculates the vertical potential-difference y10 (the hall output voltage) on the basis of the difference between the amplified signal difference from the circuit 461 and a reference voltage Vref, and which calculates the second detected-position signal py by multiplying a second amplification rate AA2 by the vertical potential-difference y10.

The circuit 461 has a resistor R121, a resistor R122, a resistor R123, an operational amplifier A121, and an operational amplifier A122. The operational amplifier A121 has an inverting input terminal, a non-inverting input terminal, and an output terminal. The operational amplifier A122 has an inverting input terminal, a non-inverting input terminal, and an output terminal.

One of the output terminals of the vertical hall element hv10 is connected with the non-inverting input terminal of the operational amplifier A121, so that the other terminal of the vertical hall element hv10 is connected with the non-inverting input terminal of the operational amplifier A122.

The inverting input terminal of the operational amplifier A121 is connected with the resistors R121 and R122, so that the inverting input terminal of the operational amplifier A122 is connected with the resistors R121 and R123.

The output terminal of the operational amplifier A121 is connected with the resistor R122 and the resistor R127 in the circuit 463. The output terminal of the operational amplifier A122 is connected with the resistor R123 and the resistor R129 in the circuit 463.

The circuit 463 has a resistor R127, a resistor R128, a resistor R129, a resistor R130, and an operational amplifier A125. The operational amplifier A125 has an inverting input terminal, a non-inverting input terminal, and an output terminal.

The inverting input terminal of the operational amplifier A125 is connected with the resistors R127 and R128. The non-inverting input terminal of the operational amplifier A125 is connected with the resistors R129 and R130. The output terminal of the operational amplifier A125 is connected with the resistor R12B. The second detected-position signal py, which is obtained by multiplying the second amplification rate AA2, by the vertical potential-difference y10, is output from the output terminal of the operational amplifier A125. One of the terminals of the resistor R130 is connected with the power supply whose voltage is the reference voltage Vref.

The values of the resistors R122 and R123 are the same. The values of the resistors R127 and R129 are the same. The values of the resistors R128 and R130 are the same.

The second amplification rate AA2 is based on the values of the resistors R127~R130 (the ratio of the value of the resistor R127 to the value of the resistor R128).

The operational amplifiers A121 and A122 are the same type of amplifier.

The circuit 466 has a resistor R139 and an operational amplifier A128, similar to the circuit 466 in the first embodiment. The operational amplifier A128 has an inverting input terminal, a non-inverting input terminal, and an output terminal.

The inverting input terminal of the operational amplifier A128 is connected with the resistor R139 and one of the input terminals of the vertical hall element hv10. The potential of the non-inverting input terminal of the operational amplifier A128 is set at the second voltage YVf corresponding to the current having the second optimized vertical hall-element current-value ysDi2, that flows through the input terminals of the vertical hall element hv10. The value of the second voltage YVf is obtained by multiplying the second optimized vertical hall-element current-value ysDi2 by the value of the resistor R139.

Accordingly, the value of the second voltage YVf is a function of the second focal distance F2 of the camera lens 67.

The output terminal of the operational amplifier A128 is connected with the other input terminal of the vertical hall element hv10. One of the terminals of the resistor R139 is grounded.

In this embodiment, the adjusted current values which are calculated by using the first and second adjustment operations (the first optimized horizontal hall-element current-value xsDi1 and the first optimized vertical hall-element current-value ysDi1), are further adjusted corresponding to the focal distance of the camera lens 67. Or, the second optimized horizontal hall-element current-value xsDi2 is calculated by multiplying the first optimized horizontal hall-element current-value xsDi1 by the coefficient value, obtained on the basis of the values of the first and second focal distances F1 and F2. Similarly, the second optimized vertical hall-element current-value ysDi2 is calculated by multiplying the first optimized vertical hall-element current-value ysDi1 by the coefficient value, obtained on the basis of the value of the first and second focal distances F1 and F2.

The first voltage XVf is applied to the input terminals of the horizontal hall element hh10, where current having the second optimized horizontal hall-element current-value xsDi2 (corresponding to the value of the second focal distance F2) flows through the input terminals of the horizontal hall element hh10.

The second voltage YVf is applied to the input terminals of the vertical hall element hv10, where current having the second optimized vertical hall-element current-value ysDi2 (corresponding to the value of the second focal distance F2) flows through the input terminals of the vertical hall element hv10.

Accordingly, the first detecting-resolution of the A/D converter A/D 2 for A/D converting the first detected-position signal px (the first detecting-resolution) can be optimized corresponding to the focal distance of the camera lens 67. Similarly, the second detecting-resolution of the A/D converter A/D 3 for A/D converting the second detected-position signal py (the second detecting-resolution) can be optimized corresponding to the focal distance of the camera lens 67.

When the focal distance of the camera lens 67 is set to a short distance in the range of the focal distance in the camera lens 67, the movement range of the movable unit 30a for the anti-shake operation may be small in comparison with when the focal distance of the camera lens 67 is set to a long distance in the range of the focal distance in the camera lens 67. Therefore, the detecting-resolution can be raised utilizing the small movement range of the movable unit 30a, so that an accurate position detecting operation can be performed in comparison with when the focal distance of the camera lens 67 is set to a long distance in the range of the focal distance in the camera lens 67.

Figure 8:
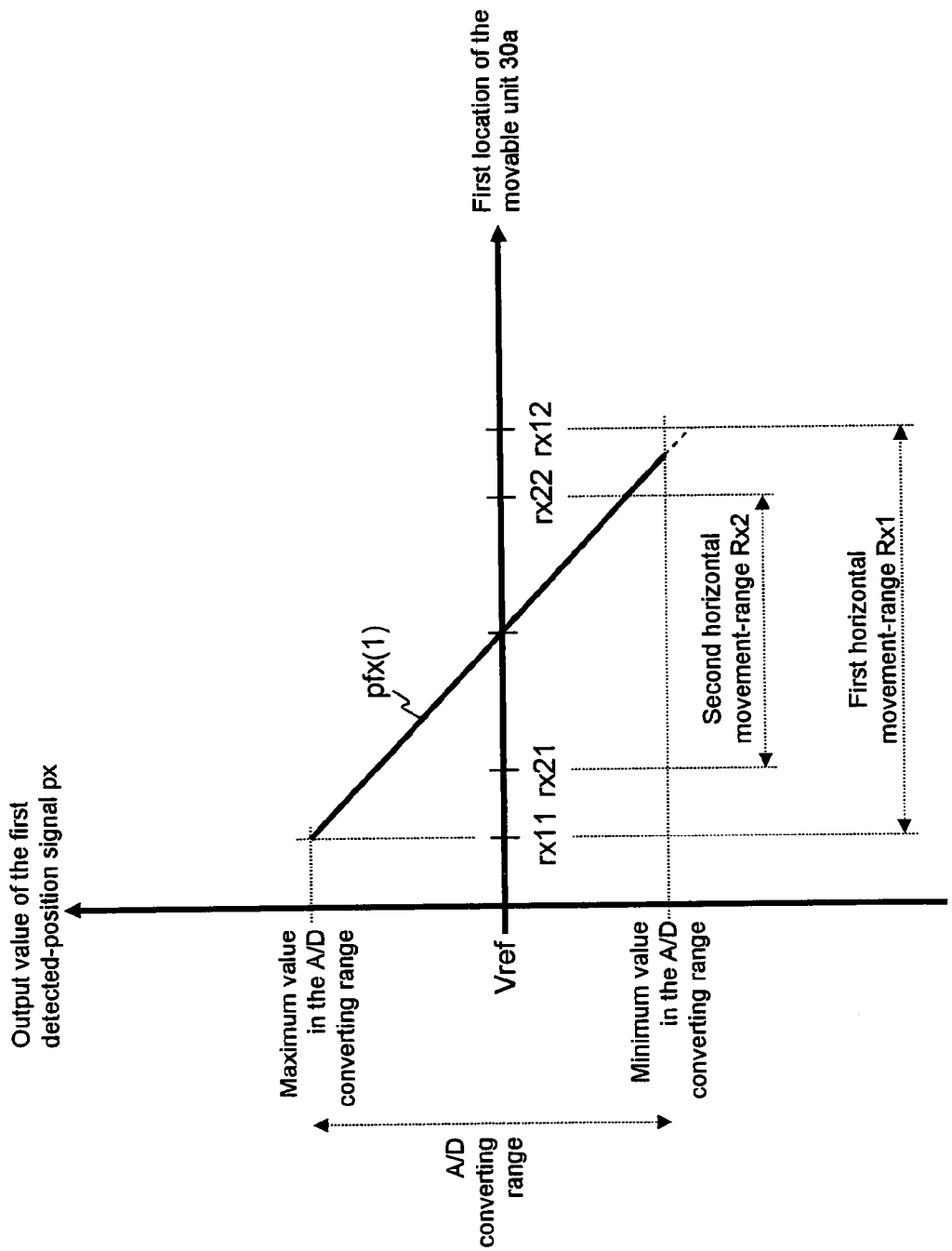
FIG. 8 shows a relationship between the first location in the first direction of the movable unit and the output value of the first detected-position signal, when the center of the movable unit contacts the first horizontal edge-point, and when the value of the current (the first horizontal hall-element current-value), which flows through the input terminals of the horizontal hall element, is adjusted where the output value of the first detected-position signal is the same as the maximum value in the A/D converting range of the A/D converter of the CPU.
Figure 9:
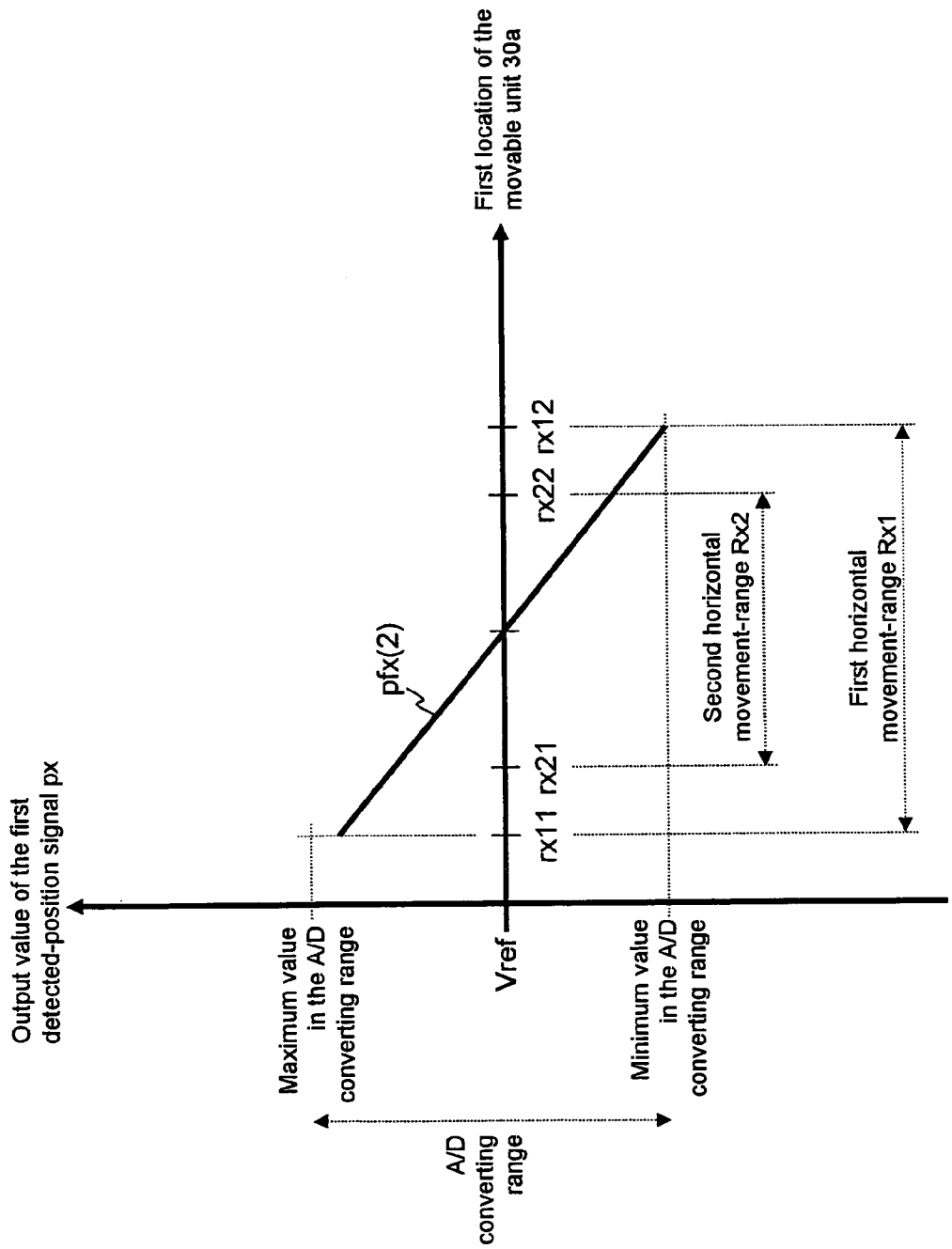
FIG. 9 shows a relationship between the first location in the first direction of the movable unit and the output value of the first detected-position signal, when the center of the movable unit contacts the second horizontal edge-point, and when the value of the current (the second horizontal hall-element current-value), which flows through the input terminals of the horizontal hall element, is adjusted where the output value of the first detected-position signal is the same as the minimum value in the A/D converting range of the A/D converter of the CPU.

Specifically, the first initial-adjustment operation is explained by using FIGS. 8 and 9.

FIG. 8 shows a relationship between the first location in the first direction x of the movable unit 30a and the output value of the first detected-position signal px, when the center of the movable unit 30*a* contacts the first horizontal edge-point rx11, and when the value of the current (the first horizontal hall-element current-value xDi1), which flows through the input terminals of the horizontal hall element hh10, is adjusted where the output value of the first detected-position signal px is the same as the maximum value in the A/D converting range of the A/D converter A/D 2 of the CPU 21.

A first line pfx(1) in FIG. 8 is composed of a thick line and a broken line. The broken line part of the first line pfx(1) shows a condition where the output value of the first detected-position signal px is under the minimum value in the A/D converting range of the A/D converter A/D 2 of the CPU 21, so that an accurate position detecting operation can not be performed, when the center of the movable unit 30*a* contacts the second horizontal edge-point rx12.

FIG. 9 shows a relationship between the first location in the first direction x of the movable unit 30*a* and the output value of the first detected-position signal px, when the center of the movable unit 30*a* contacts the second horizontal edge-point rx12, and when the value of the current (the second horizontal hall-element current-value xDi2), which flows through the input terminals of the horizontal hall element hh10, is adjusted where the output value of the first detected-position signal px is the same as the minimum value in the A/D converting range of the A/D converter A/D 2 of the CPU 21.

A second line pfx(2) in FIG. 9 is composed of a thick line. The thick line of the second line pfx(2) shows a condition where the output value of the first detected-position signal px is not over the maximum value in the A/D converting range of the A/D converter A/D 2 of the CPU 21, so that an accurate position detecting operation can be performed, when the center of the movable unit 30*a* contacts the first horizontal edge-point rx11.

Accordingly, an accurate position detecting operation can be performed for the first horizontal movement-range Rx1.

The first detected-position signal px is a function of a first magnetic-flux density B1, between the horizontal hall element hh10 and the first position-detecting and driving magnet 411*b*, and a value of the current which flows through the input terminals of the horizontal hall elements hh10.

The second detected-position signal py is a function of a second magnetic-flux density B2, between the vertical hall element hv10 and second position-detecting and driving magnet 412, and a value of the current which flows through the input terminals of the vertical hall elements hv10.

It is judged whether the first horizontal hall-element current-value xDi1 is smaller than the second horizontal hall-element current-value xDi2, so that the smaller value of the first and second horizontal hall-element current-values xDi1 and xDi2, is determined as the first optimized horizontal hall-element current-value xsDi1.

In this example which is shown in FIGS. 8 and 9, the second horizontal hall-element current-value xDi2 is smaller than the first horizontal hall-element current-value xDi1, so that the second horizontal hall-element current-value xDi2 is determined as the first optimized horizontal hall-element current-value xsDi1.

Similarly, the second initial-adjustment operation is performed, so that the first optimized vertical hall-element current-value ysDi1 is determined (not depicted).

The second optimized horizontal hall-element current-value xsDi2 is calculated by multiplying the first optimized horizontal hall-element current-value xsDi1 by the coefficient value.

The second optimized vertical hall-element current-value ysDi2 is calculated by multiplying the first optimized vertical hall-element current-value ysDi1 by the coefficient value.

The coefficient value is determined on the basis of the values of the first and second focal distances F1 and F2, in other words the coefficient value is a value obtained by dividing which the first focal distance F1 by the second focal distance F2.

Figure 10:
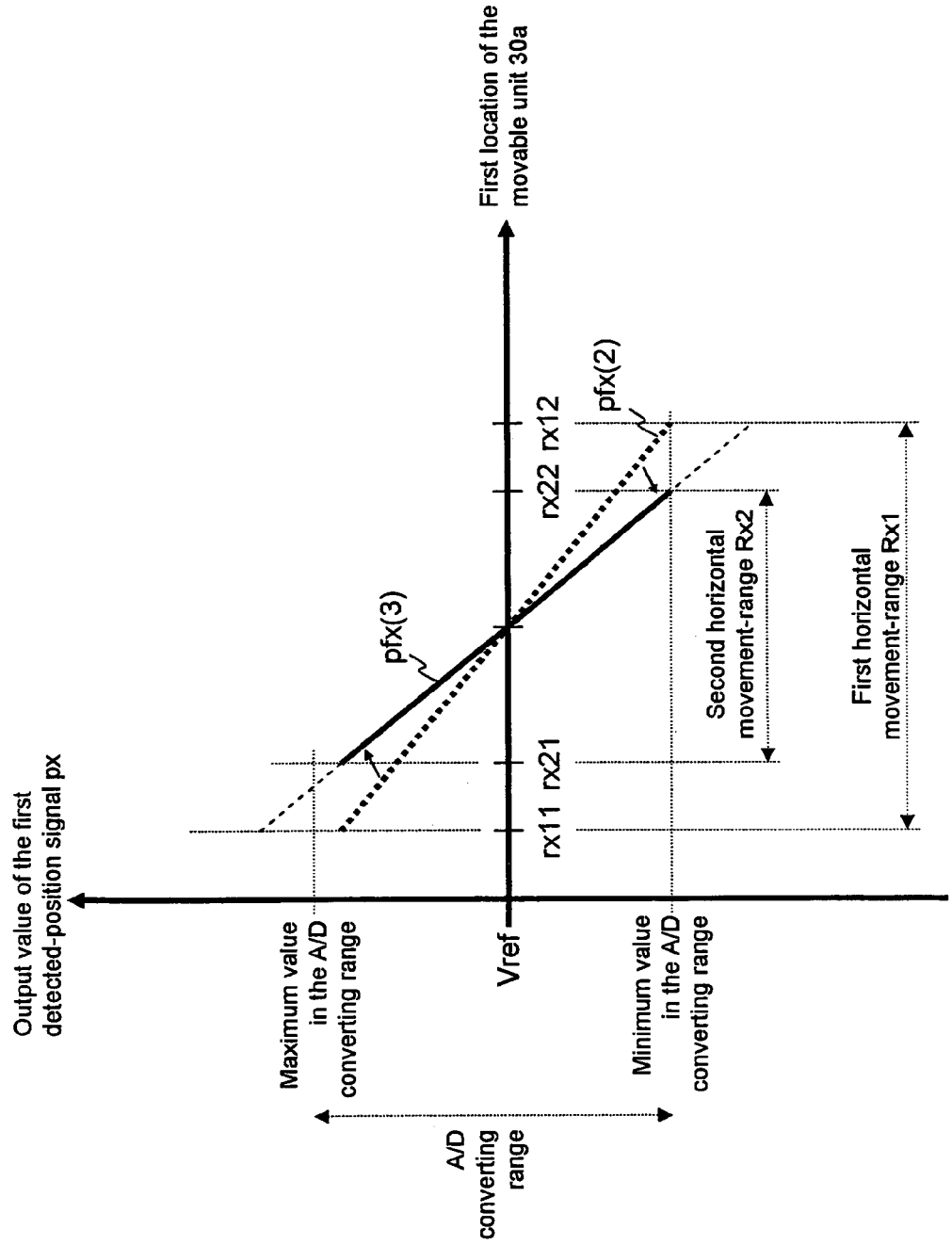
FIG. 10 shows a relationship between the first location in the first direction of the movable unit and the output value of the first detected-position signal, when current having the second optimized horizontal hall-element current-value, flows through the input terminals of the horizontal hall element.

FIG. 10 shows a relationship between the first location in the first direction x of the movable unit 30*a* and the output value of the first detected-position signal px, when current having the second optimized horizontal hall-element current-value xsDi2, flows through the input terminals of the horizontal hall element hh10.

A third line pfx(3) in FIG. 10 is composed of a thick line and a broken line. The second line pfx(2) in FIG. 10 is composed of a dotted line.

The thick part of the third line pfx(3) shows a condition where the output value of the first detected-position signal px is not over the maximum value in the A/D converting range of the A/D converter A/D 2 of the CPU 21, so that an accurate position detecting operation can be performed, when the center of the movable unit 30*a* contacts the third horizontal edge-point rx21.

Similarly, the thick part of the third line pfx(3) shows a condition where the output value of the first detected-position signal px is not under the minimum value in the A/D converting range of the A/D converter A/D 2 of the CPU 21, so that an accurate position detecting operation can be performed, when the center of the movable unit 30*a* contacts the forth horizontal edge-point rx22.

Accordingly, an accurate position detecting operation can be performed in the second horizontal movement-range Rx2.

The broken line part of the third line pfx(3) shows a condition where the output value of the first detected-position signal px is over the maximum value in the A/D converting range of the A/D converter A/D 2 of the CPU 21, when the center of the movable unit 30*a* contacts the first horizontal edge-point rx11.

Similarly, the broken line part of the third line pfx(3) shows a condition where the output value of the first detected-position signal px is under the minimum value in the A/D converting range of the A/D converter A/D 2 of the CPU 21, when the center of the movable unit 30*a* contacts the second horizontal edge-point rx12.

However, when the focal distance of the camera lens 67 is set to the second focal distance F2, the movement range of the movable unit 30*a* for the anti-shake operation, in the first direction x, is the narrow second horizontal movement-range Rx2 (not the wide first horizontal movement-range Rx1). Therefore, considering whether the accurate position detecting operation can be performed, is not necessary in the broken line part of the third line pfx(3).

When the movable unit 30*a* is located at the center of its movement range in both the first direction x and the second direction y, and when the output value of the first detected-position signal px agrees with the reference voltage Vref, the first and second horizontal hall-element current-values xDi1 and xDi2 are the same. Or, when a value of the current which flows through the input terminals of the horizontal hall element hh10, is set under the condition where an output value of the first detected-position signal px when the center of the movable unit 30*a* contacts the first horizontal edge-point rx11, agrees with the maximum value in the A/D converting range of the A/D converter A/D 2 of the CPU 21, an output value of the first detected-position signal px when the center of the movable unit 30a contacts the second horizontal edge-point rx12, agrees with the minimum value in the A/D converting range of the A/D converter A/D 2 of the CPU 21.

However, in order to make the output value of the first detected-position signal px strictly agree with the reference voltage Vref, when the movable unit 30a is located at the center of its movement range, an additional adjustment, which considers mechanical gaps of the anti-shake unit 30 and error in the values of the resistors of the hall-element signal-processing unit 45, is needed. A relationship between the second detected-position signal py and the first and second vertical hall-element current-values yDi1 and yDi2, is similar to that between the first detected-position signal px and the first and second horizontal hall-element current-values xDi1 and xDi2 which is described above.

In this embodiment, the second optimized horizontal hall-element current-value xsDi2 can be calculated corresponding to the focal distance of the camera lens 67, without the strict agreement between the output value of the first detected-position signal px and the reference voltage Vref. Similarly, the second optimized vertical hall-element current-value ysDi2 can be calculated corresponding to the focal distance of the camera lens 67, without the strict agreement between the output value of the second detected-position signal py and the reference voltage Vref.

In this embodiment, the initial-adjustment operation which adjusts the output values of the first and second detected-position signals px and py by changing the value of the current which flows through the input terminals of the horizontal hall element hh10 and the vertical hall element hv10, is explained. However, the initial-adjustment operation which adjusts the output values of the first and second detected-position signals px and py, may be performed by changing the values of the first and second magnetic-flux densities B1 and B2 or by changing the values of the first and second amplification rates AA1 and AA2.

For example, the values of the first and second amplification rates AA1 and AA2 can be changed by changing the values of the resistors in the hall-element signal-processing unit 45.

Further, when the first and second position-detecting and driving magnets 411b and 412b are composed of coils or electromagnets, the values of the first and second magnetic-flux densities B1 and B2 can be changed by changing the value of the current which flows through the coils or electromagnets.

Further, because the first optimized horizontal and first optimized vertical hall-element current-values xsDi1 and ysDi1 are stored in the memory unit 72, these values are not deleted even if the photographing apparatus 1 (the memory unit 72) is set to the off state (power off). Accordingly, the first and second initial-adjustment operations may be performed only one time, in order for the CPU 21 to read the first optimized horizontal and first optimized vertical hall-element current-values xsDi1 and ysDi1.

Figure 11:
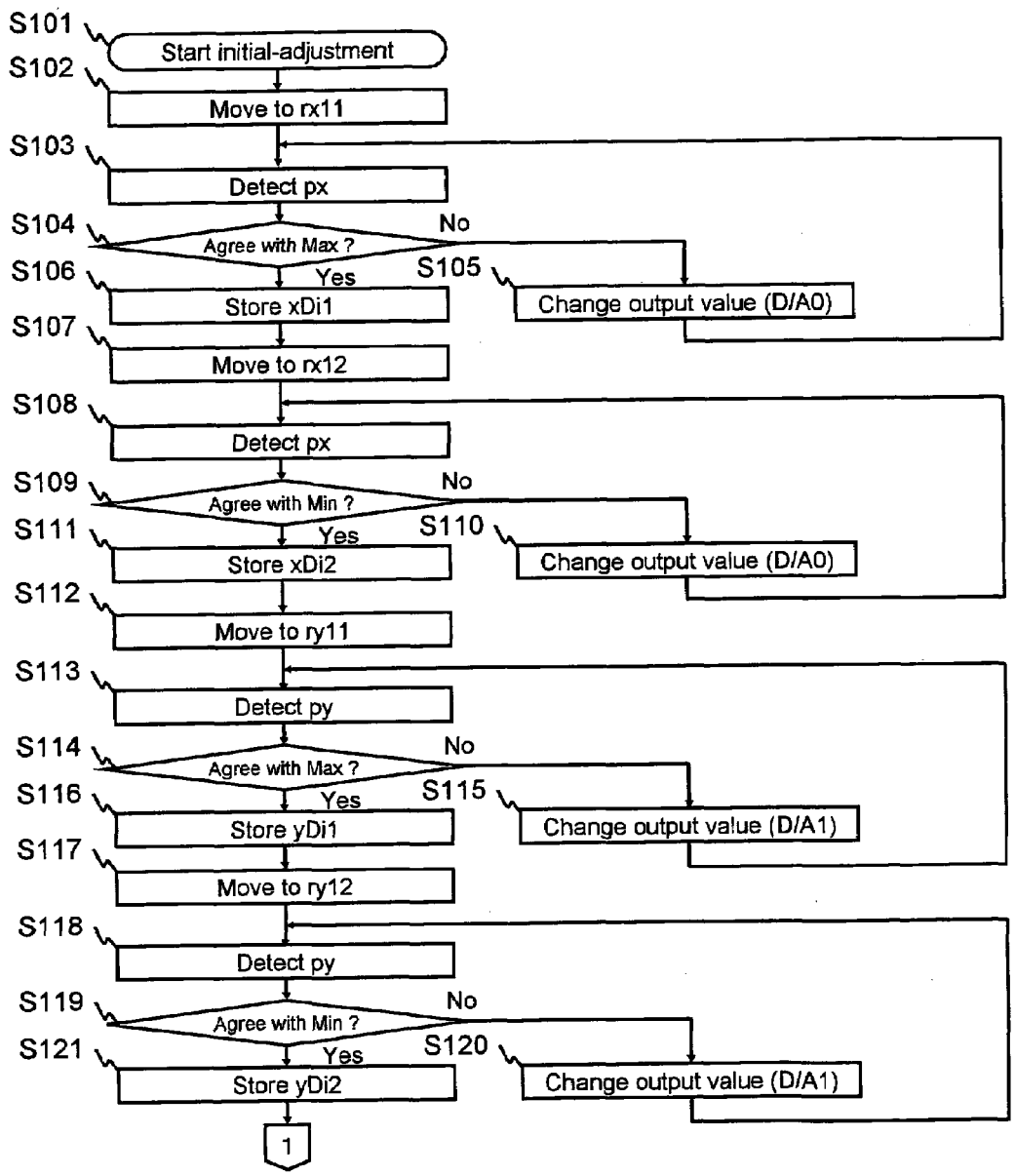
FIG. 11 is a flowchart that shows the first half part of the first and second initial-adjustment operations.
Figure 12:
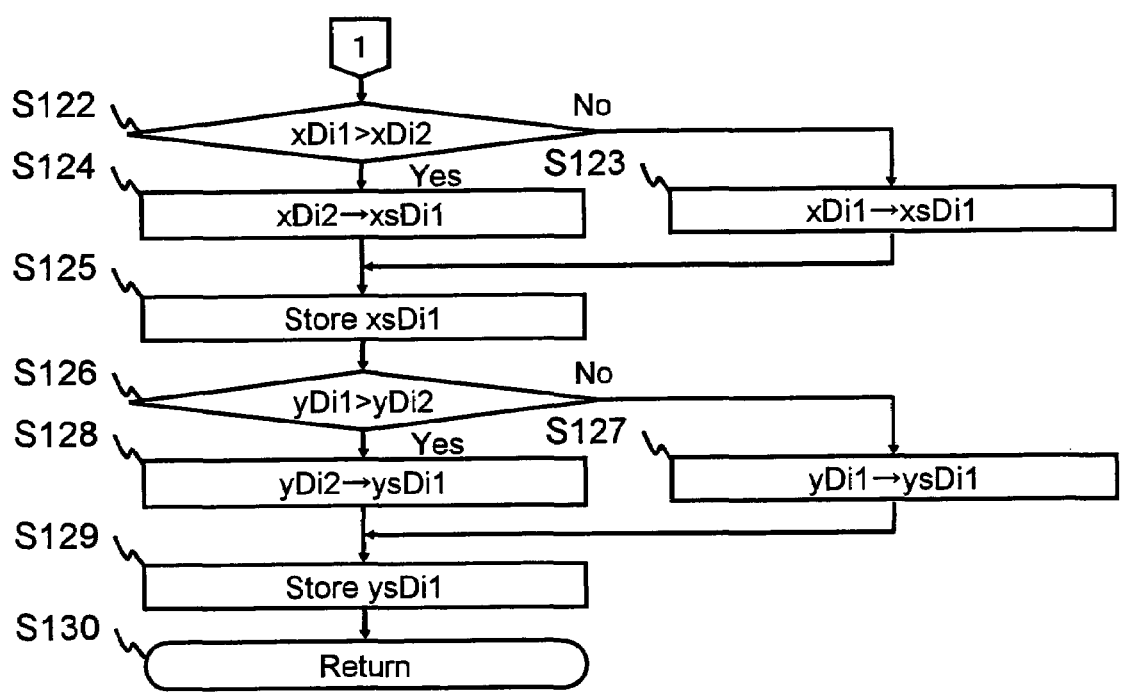
FIG. 12 is a flowchart that shows the second half part of the first and second initial-adjustment operations.

Next, the flow of the first and second initial-adjustment operations is explained by using flowcharts in FIGS. 11 and 12.

In step S101, the adjusting unit 71 is set to the on state, so that the photographing apparatus 1 is set in the adjusting mode, and the first and second initial-adjustment operations are started, and the focal distance of the camera lens 67 is set to the first focal distance F1.

In step S102, the first PWM duty dx is input to the driver circuit 29 from the PWM 0 of the CPU 21, so that the movable unit 30a is moved to where the center of the movable unit 30a contacts the first horizontal edge-point rx11. In step S103, the first detected-position signal px at this time, is detected and is input to the A/D converter A/D 2 of the CPU 21.

In step S104, it is judged whether the output value of the first detected-position signal px agrees with the maximum value in the A/D converting range of the A/D converter A/D 2 of the CPU 21.

When it is judged that the output value of the first detected-position signal px does not agree with the maximum value in the A/D converting range of the A/D converter A/D 2 of the CPU 21, the output value, which is output to the hall-element signal-processing unit 45, from the D/A converter D/A 0 of the CPU 21, is changed, so that the flow is returned to step S103, in step S105.

When it is judged that the output value of the first detected-position signal px agrees with the maximum value in the A/D converting range of the A/D converter A/D 2 of the CPU 21, the value of the current (the first horizontal hall-element current-value xDi1), which flows through the input terminals of the horizontal hall element hh10 at this time, is temporarily stored in the CPU 21 etc, in step S106.

In step S107, the first PWM duty dx is input to the driver circuit 29 from the PWM 0 of the CPU 21, so that the movable unit 30a is moved to where the center of the movable unit 30a contacts the second horizontal edge-point rx12. In step S108, the first detected-position signal px at this time, is detected and is input to the A/D converter A/D 2 of the CPU 21.

In step S109, it is judged whether the output value of the first detected-position signal px agrees with the minimum value in the A/D converting range of the A/D converter A/D 2 of the CPU 21.

When it is judged that the output value of the first detected-position signal px does not agree with the minimum value in the A/D converting range of the A/D converter A/D 2 of the CPU 21, the output value, which is output to the hall-element signal-processing unit 45, from the D/A converter D/A 0 of the CPU 21, is changed, so that the flow is returned to step S108, in step S110.

When it is judged that the output value of the first detected-position signal px agrees with the minimum value in the A/D converting range of the A/D converter A/D 2 of the CPU 21, the value of the current (the second horizontal hall-element current-value xDi2), which flows through the input terminals of the horizontal hall element hh10 at this time, is temporarily stored in the CPU 21 etc, in step S111.

In step S112, the second PWM duty dy is input to the driver circuit 29 from the PWM 1 of the CPU 21, so that the movable unit 30a is moved to where the center of the movable unit 30a contacts the first vertical edge-point ry11. In step S113, the second detected-position signal py at this time, is detected and is input to the A/D converter A/D 3 of the CPU 21.

In step S114, it is judged whether the output value of the second detected-position signal py agrees with the maximum value in the A/D converting range of the A/D converter A/D 3 of the CPU 21.

When it is judged that the output value of the second detected-position signal py does not agree with the maximum value in the A/D converting range of the A/D converter A/D 3 of the CPU 21, the output value, which is output to the hall-element signal-processing unit 45, from the D/A converter D/A 1 of the CPU 21, is changed, so that the flow is returned to step S113, in step S115.

When it is judged that the output value of the second detected-position signal py agrees with the maximum value in the A/D converting range of the A/D converter A/D 3 of the CPU 21, the value of the current (the first vertical hall-element current-value yDi1), which flows through the input terminals of the vertical hall element hv10 at this time, is temporarily stored in the CPU 21 etc, in step S116.

In step S117, the second PWM duty dy is input to the driver circuit 29 from the PWM 1 of the CPU 21, so that the movable unit 30a is moved to where the center of the movable unit 30a contacts the second vertical edge-point ry12. In step S118, the second detected-position signal py at this time, is detected and is input to the A/D converter A/D 3 of the CPU 21.

In step S119, it is judged whether the output value of the second detected-position signal py agrees with the minimum value in the A/D converting range of the A/D converter A/D 3 of the CPU 21.

When it is judged that the output value of the second detected-position signal py does not agree with the minimum value in the A/D converting range of the A/D converter A/D 3 of the CPU 21, the output value, which is output to the hall-element signal-processing unit 45, from the D/A converter D/A 1 of the CPU 21, is changed, so that the flow is returned to step S118, in step S120.

When it is judged that the output value of the second detected-position signal py agrees with the minimum value in the A/D converting range of the A/D converter A/D 3 of the CPU 21, the value of the current (the second vertical hall-element current-value yDi2), which flows through the input terminals of the vertical hall element hv10 at this time, is temporarily stored in the CPU 21 etc, in step S121.

In step S122, it is judged whether the first horizontal hall-element current-value xDi1 is larger than the second horizontal hall-element current-value xDi2.

When it is judged that the first horizontal hall-element current-value xDi1 is not larger than the second horizontal hall-element current-value xDi2, the first optimized horizontal hall-element current-value xsDi1 is set to the first horizontal hall-element current-value xDi1, in step S123.

When it is judged that the first horizontal hall-element current-value xDi1 is larger than the second horizontal hall-element current-value xDi2, the first optimized horizontal hall-element current-value xsDi1 is set to the second horizontal hall-element current-value xDi2, in step S124.

In step S125, the first optimized horizontal hall-element current-value xsDi1 is stored in the memory unit 72, so that the first initial-adjustment operation is finished.

In step S126, it is judged whether the first vertical hall-element current-value yDi1 is larger than the second vertical hall-element current-value yDi2.

When it is judged that the first vertical hall-element current-value yDi1 is not larger than the second vertical hall-element current-value yDi2, the first optimized vertical hall-element current-value ysDi1 is set to the first vertical hall-element current-value yDi1, in step S127.

When it is judged that the first vertical hall-element current-value yDi1 is larger than the second vertical hall-element current-value yDi2, the first optimized vertical hall-element current-value ysDi1 is set to the second vertical hall-element current-value yDi2, in step S128.

In step S129, the first optimized vertical hall-element current-value ysDi1 is stored in the memory unit 72. In step S130, the second initial-adjustment operation is finished.

Figure 13:
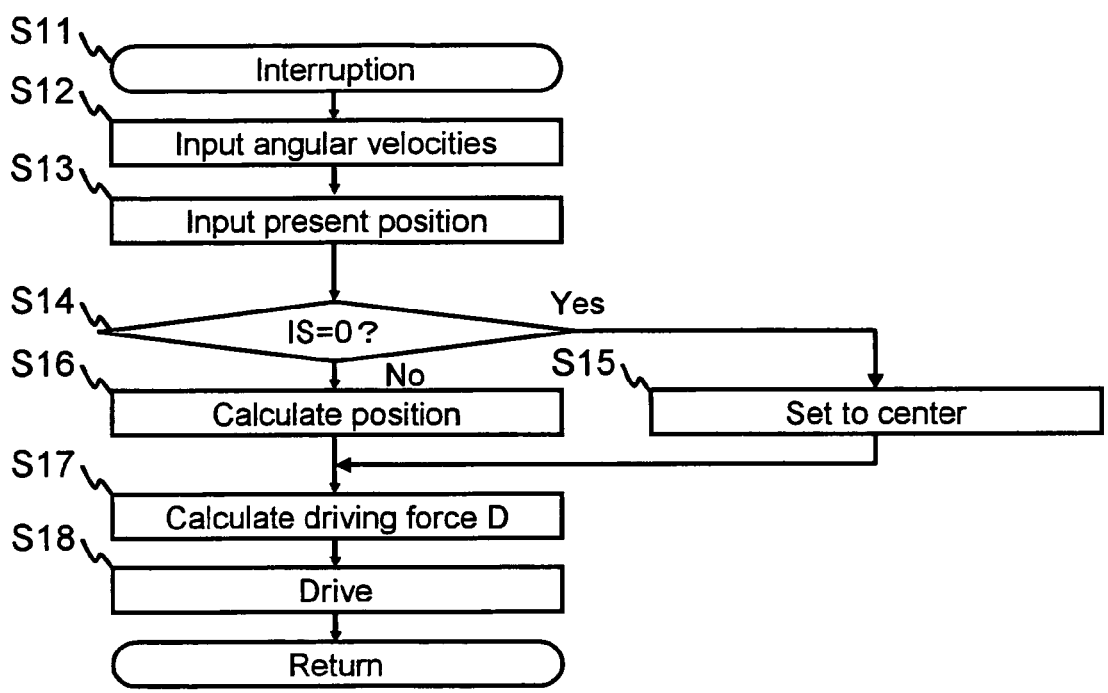
FIG. 13 is a flowchart of the anti-shake operation, which is performed at every predetermined time interval, as an interruption, process.

Next, the flow of the anti-shake operation, which is performed at every predetermined time interval (1 ms) as an interruption process, independently of the other operations, is explained by using the flowchart in FIG. 13.

In step S11, the interruption process for the anti-shake operation is started. In step S12, the first angular velocity vx, which is output from the angular velocity detecting unit 25, is input to the A/D converter A/D 0 of the CPU 21 and is converted to a digital signal. The second angular velocity vy, which is output from the angular velocity detecting unit 25, is input to the A/D converter A/D 1 of the CPU 21 and is converted to a digital signal.

In step S13, the position of the movable unit 30a is detected by the hall element unit 44a, so that the first detected-position signal px, which is calculated by the hall-element signal-processing unit 45, is input to the A/D converter A/D 2 of the CPU 21 and is converted to a digital signal, and the second detected-position signal py, which is calculated by the hall-element signal-processing unit 45, is input to the A/D converter A/D 3 of the CPU 21 and is converted to a digital signal. Therefore, the present position of the movable unit 30a P (pdx, pdy) is determined.

At this time, the first voltage XVf is applied to the circuit 456 of the hall-element signal-processing unit 45 from the D/A converter D/A 0 of the CPU 21, where current having the second optimized horizontal hall-element current-value xsDi2, which changes corresponding to the focal distance, flows through the input terminals of the horizontal hall element hh10 of the hall element unit 44a, so that the second voltage YVf is applied to the circuit 466 of the hall-element signal-processing unit 45 from the D/A converter D/A 1 of the CPU 21, where current having the second optimized vertical hall-element current-value ysDi2, which changes corresponding to the focal distance, flows through the input terminals of the vertical hall element hv10 of the hall element unit 44a.

In step S14, it is judged whether the value of the IS is 0. When it is judged that the value of the IS is 0 (IS=0), in other words in the non anti-shake mode, the position S (sx, sy) of the movable unit 30a (the imaging unit 39a), which should be moved to, is set to the center of its movement range, in step S15. When it is judged that the value of the IS is not 0 (IS=1), in other words in the anti-shake mode, the position S (sx, sy) of the movable unit 30a (the imaging unit 39a), which should be moved to, is calculated on the basis of the first and second angular velocities vx and vy, in step S16.

In step S17, the driving force D, which drives the driver circuit 29 in order to move the movable unit 30a to the position S, in other words the first PWM duty dx and the second PWM duty dy, is calculated on the basis of the position S (sx, sy), which is determined in step S15 or step S16, and the present position P (pdx, pdy).

In step S18, the first driving coil 31a is driven by using the first PWM duty dx through the driver circuit 29, and the second driving coil 32a is driven by using the second PWM duty dy through the driver circuit 29, so that the movable unit 30a is moved.

The process in steps S17 and S18 is an automatic control calculation, which is used with the PID automatic control for performing general (normal) proportional, integral, and differential calculations.

Figure 14:
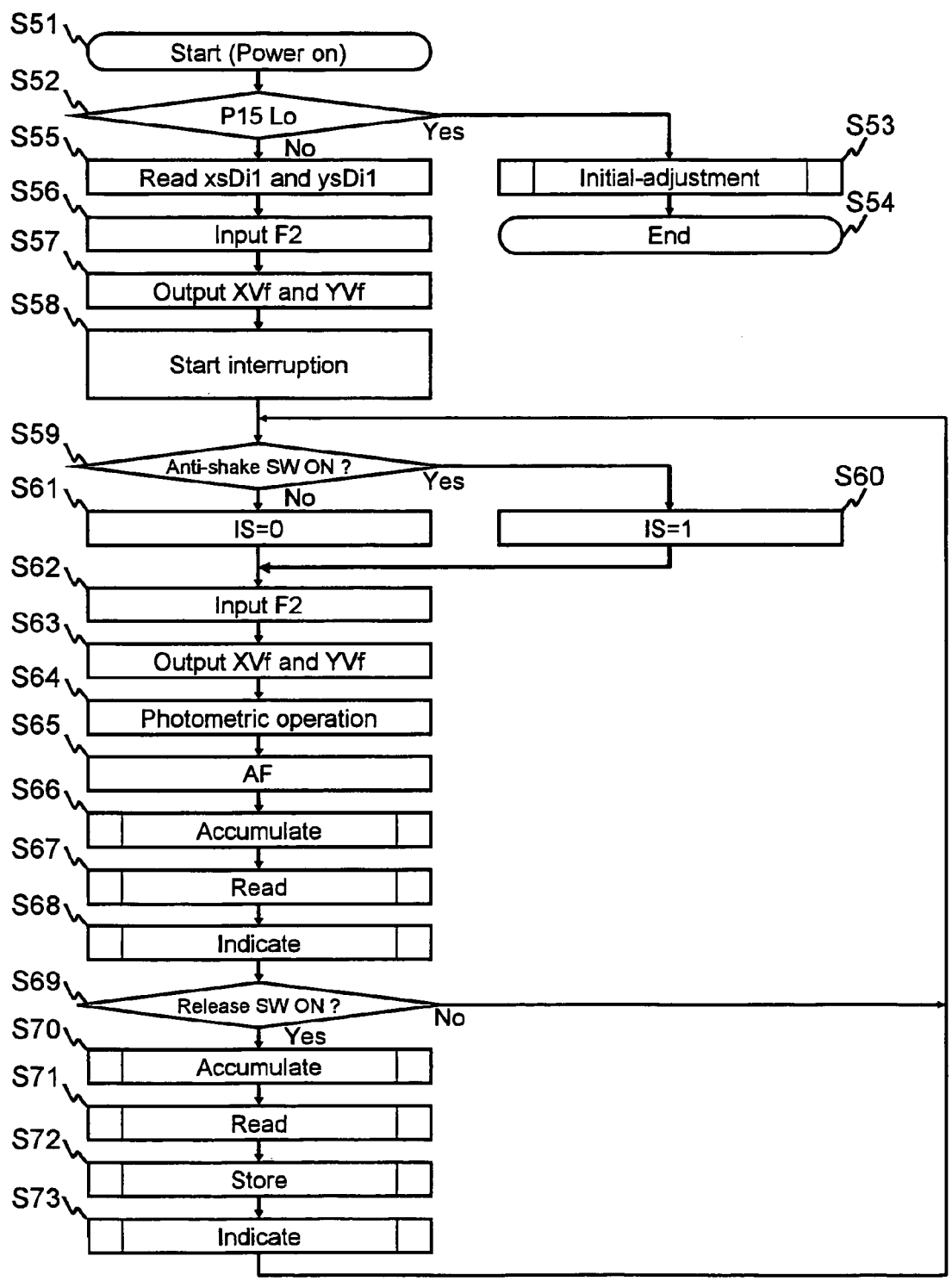
FIG. 14 is a flowchart that shows the imaging operation.

Next, the imaging operation of the photographing apparatus 1 is explained by using the flowchart in FIG. 14.

In step S51, the Pon switch 11a is set to the on state, so that the photographing apparatus 1 is set to the on state (power on). In step S52, it is judged whether the output signal to the port P15 of the CPU 21, from the adjusting unit 71, is the Lo signal.

When it is judged that the Lo signal is output from the adjusting unit 71 to the port P15 of the CPU 21, the initial-adjustment operation (the first and second initial-adjustment operations) is performed which is described by using the flowcharts in FIGS. 11 and 12, in step S53. In step S54, the initial-adjustment operation is finished.

When it is judged that the Lo signal is not output from the adjusting unit 71 to the port P15 of the CPU 21 in step S52, the first optimized horizontal hall-element current-value xsDi1 and the first optimized vertical hall-element current-value ysDi1 are read from the memory unit 72 through the port P6 of the CPU 21, in step S55.

In step S56, the information regarding the value of the second focal distance F2 is input to port P7 of the CPU 21, through a lens-position detecting apparatus, from the camera lens 67. In step S57, the adjustment-operation regarding the focal distance is preformed, so that the second optimized horizontal hall-element current-value xsDi2 and the second optimized vertical hall-element current-value ysDi2 are calculated.

After this calculation, the first voltage XVf corresponding to the second optimized horizontal hall-element current-value xsDi2, is output from the D/A converter D/A 0 of the CPU 21, and is applied to the input terminal of the horizontal hall element hh10, through the circuit 456. Similarly, the second voltage YVf corresponding to the second optimized vertical hall-element current-value ysDi2, is output from the D/A converter D/A 1 of the CPU 21, and is applied to the input terminal of the vertical hall element hv10, through the circuit 466.

In step S58, the anti-shake operation, which is explained by using the flowchart in FIG. 13, is performed at every predetermined time interval (1 ms) as an interruption process, independently of the other operations (steps S59 to S73).

In step S59, it is judged whether the anti-shake switch 14*a* is in the on state. When it is judged that the anti-shake switch 14*a* is in the on state, the parameter IS is set to 1 (IS=1), in step S60. When it is judged that the anti-shake switch 14*a* is not in the on state (off state), the parameter IS is set to 0 (IS=0), in step S61.

In step S62, the information regarding the value of the second focal distance F2 is input to port P7 of the CPU 21, through a lens-position detecting apparatus, from the camera lens 67. In step S63, the adjustment-operation regarding the focal distance is preformed, so that the second optimized horizontal hall-element current-value xsDi2 and the second optimized vertical hall-element current-value ysDi2 are calculated.

After this calculation, the first voltage XVf corresponding to the second optimized horizontal hall-element current-value xsDi2, is output from the D/A converter D/A 0 of the CPU 21, and is applied to the input terminal of the horizontal hall element hh10, through the circuit 456. Similarly, the second voltage YVf corresponding to the second optimized vertical hall-element current-value ysDi2, is output from the D/A converter D/A 1 of the CPU 21, and is applied to the input terminal of the vertical hall element hv10, through the circuit 466.

In step S64, the photometric switch 12*a* is set to the on state, so that an AE sensor of the AE unit 23 is driven, the photometric operation is performed, and the aperture value and the exposure time are calculated. In step S65, an AF sensor of the AF unit 24 is driven, the AF sensing is performed, and the focusing operation is performed, by driving a lens control circuit of the AF unit 24.

In step S66, the exposure operation, in other words electric charge accumulation of the imaging device 39*a*1, is performed.

In step S67, the electric charge which is accumulated in the imaging device 39*a*1 in the exposure time is read, so that, in step S68, the electric charge which is read is indicated on the indicating unit 17, as the image signal which is imaged by the imaging block 22.

In step S69, it is judged whether the release switch 13*a* is in the on state. When it is judged that the release switch 13*a* is not in the on state, the flow is returned to step S59, so that the imaging operation is repeatedly performed. When it is judged that the release switch 13*a* is in the on state, the exposure operation, in other words electric charge accumulation of the imaging device 39*a*1, is performed, in step S70.

In step S71, the electric charge which is accumulated in the imaging device 39*a*1 in the exposure time is read, so that, in step S72, the electric charge which is read is stored in the memory of the photographing apparatus 1, as the image signal which is imaged by the imaging block 22. In step S73, the image signal which is stored, is indicated on the indicating unit 17. After that, the flow is returned to step S59, so that the imaging operation is repeatedly performed.

In this embodiment, the first position-detecting and driving magnet 411*b* is one body in order to detect the first location in the first direction x of the movable unit 30*a*, and drive the movable unit 30*a* in the first direction x. However a magnet for detecting the first location and a magnet for driving the movable unit 30*a* in the first direction x, may be separated.

Similarly, the second position-detecting and driving magnet 412*b* is one body in order to detect the second location in the second direction y of the movable unit 30*a*, and drive the movable unit 30*a* in the second direction y. However a magnet for detecting the second location and a magnet for driving the movable unit 30*a* in the second direction y, may be separated.

Further, it is explained that the hall element unit 44*a* is attached to the movable unit 30*a* and the position-detecting magnets (the first and second position-detecting and driving magnets 411*b* and 412*b*) are attached to the fixed unit 30*b*, however the hall element unit may be attached to the fixed unit and position-detecting magnets may be attached to the movable unit.

Further, it is explained that the movable unit 30*a* has the imaging device 39*a*1. However, the movable unit 30*a* may have a hand-shake correcting lens instead of the imaging device.

Further, it is explained that the hall element is used for position-detecting as the magnetic-field change-detecting element, however, another detecting element may be used for position-detecting. Specifically, the detecting element may be an MI (Magnetic Impedance) sensor, in other words a high-frequency carrier-type magnetic-field sensor., or a magnetic resonance-type magnetic-field detecting element, or an MR (Magneto-Resistance effect) element. When one of the MI sensor, the magnetic resonance-type magnetic-field detecting element, and the MR element is used, the information regarding the position of the movable unit can be obtained by detecting the magnetic-field change, similar to using the hall element.

Further, in this embodiment, the movable unit 30*a* is movable in the first direction x and the second direction y, relative to the fixed unit 30*b*, so that the position-detecting operation is performed by detecting the position of the movable unit in the first direction x (the first location), and in the second direction y (the second location). However, any other methods (or means) for moving the movable unit 30a on a plane which is perpendicular to the third direction z (the optical axis LX), and for detecting the movable unit 30a on the plane, are acceptable.

For example, the movement of the movable unit may only be in one dimension, so that the movable unit can be moved only in the first direction x (not the second direction y). In this case, the parts regarding the movement of the movable unit in the second direction y and regarding the position-detecting operation of the movable unit in the second direction y, such as the vertical hall element hv10 etc., may be omitted (see FIG. 3 etc.).

Further, it is explained that the value of the current is changed proportionally to the focal distance, in the adjustment operation regarding the focal distance, because the movement range of the movable unit 30a in the first direction x (or the second direction y) is changed proportionally to the focal distance. However, the adjustment operation regarding the focal distance is not limited to the proportional change, so that the value of the current may be changed corresponding to the focal distance.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2004-063909 (filed on Mar. 8, 2004), which is expressly incorporated herein by reference, in its entirety.

The invention claimed is:

1. An anti-shake apparatus of a photographing apparatus, comprising:
    a movable unit that has one of an imaging device and a hand-shake correcting lens, and that can be moved in first and second directions, said first direction being perpendicular to an optical axis of a camera lens of said photographing apparatus, and said second direction being perpendicular to said optical axis and said first direction;
    a fixed unit that slidably supports said movable unit in both said first and second directions;
    a signal-processing unit; and
    a control unit that controls said movable unit, said fixed unit, and said signal-processing unit, and that has first and second A/D converters;
    one of said movable unit and said fixed unit having a magnetic-field change-detecting unit which has a horizontal magnetic-field change-detecting element for detecting a position of said movable unit in said first direction as a first location, and a vertical magnetic-field change-detecting element for detecting a position of said movable unit in said second direction as a second location;
    another of said movable unit and said fixed unit having a position-detecting magnet unit which is used for detecting said first and second locations, and which faces said magnetic-field change-detecting unit;
    said signal-processing unit outputting a first detected-position signal which specifies said first location on the basis of output signals of said horizontal magnetic-field change-detecting element, to said first A/D converter, and outputting a second detected-position signal which specifies said second location on the basis of output signals of said vertical magnetic-field change-detecting element, to said second A/D converter;
    said control unit calculating said first location on the basis of an A/D converting operation by said first A/D converter, for said first detected-position signal, and calculating said second location on the basis of an A/D converting operation by said second A/D converter, for said second detected-position signal, and performing an adjusting operation which maximizes a width between minimum and maximum values of said first detected-position signal, in a horizontal movement range of said movable unit, and in an A/D converting range of said first A/D converter, and which maximizes a width between minimum and maximum values of said second detected-position signal, in a vertical movement range of said movable unit, and in an A/D converting range of said second A/D converter;
    said horizontal movement range being proportional to a focal distance of said camera lens; and
    said vertical movement range being proportional to said focal distance.

2. The anti-shake apparatus according to claim 1, wherein said adjusting operation has a first initial-adjustment operation, a second initial-adjustment operation, and an adjustment-operation regarding the focal distance;
    in said first initial-adjustment operation, a first detecting-resolution of said first A/D converter for A/D converting said first detected-position signal, is adjusted by changing a value of the current which flows through the input terminals of said horizontal magnetic-field change-detecting element, when the focal distance of said camera lens is set to a first focal distance, so that a first optimized horizontal current-value for the current that flows through said input terminals of said horizontal magnetic-field change-detecting element, is calculated;
    in said second initial-adjustment operation, a second detecting-resolution of said second A/D converter for A/D converting said second detected-position signal, is adjusted by changing a value of the current which flows through the input terminals of said vertical magnetic-field change-detecting element, when the focal distance of said camera lens is set to said first focal distance, so that a first optimized vertical current-value for the current that flows through said input terminals of said vertical magnetic-field change-detecting element, is calculated; and
    in said adjustment-operation regarding the focal distance, a second optimized horizontal current-value for the current that flows through said input terminals of said horizontal magnetic-field change-detecting element, when the focal distance of said camera lens is set to a second focal distance which is chosen by the operator, is calculated by multiplying said first optimized horizontal current-value by a coefficient value, and a second optimized vertical current-value for the current that flows through said input terminals of said vertical magnetic-field change-detecting element, when the focal distance of said camera lens is set to said second focal distance, is calculated by multiplying said first optimized vertical current-value by said coefficient value.

3. The anti-shake apparatus according to claim 2, wherein said first optimized horizontal current-value is the smaller value of first and second horizontal current-values, in said first initial-adjustment operation;
    said first optimized vertical current-value is the smaller value of first and second vertical current-values, in said second initial-adjustment operation;

said first horizontal current-value is the value of the current which flows through said input terminals of said horizontal magnetic-field change-detecting element, under the condition where the output value of said first detected-position signal is the same as the maximum value in the A/D converting range of said first A/D converter, when said movable unit contacts a first horizontal edge-point which is one of the edge-points of said horizontal movement range corresponding to said first focal distance;

said second horizontal current-value is the value of the current which flows through said input terminals of said horizontal magnetic-field change-detecting element, under the condition where the output value of said first detected-position signal is the same as the minimum value in the A/D converting range of said first A/D converter, when said movable unit contacts a second horizontal edge-point which is another of the edge-points of said horizontal movement range corresponding to said first focal distance;

said first vertical current-value is the value of the current which flows through said input terminals of said vertical magnetic-field change-detecting element, under the condition where the output value of said second detected-position signal is the same as the maximum value in the A/D converting range of said second A/D converter, when said movable unit contacts a first vertical edge-point which is one of the edge-points of said vertical movement range corresponding to said first focal distance; and said second vertical current-value is the value of the current which flows through said input terminals of said vertical magnetic-field change-detecting element, under the condition where the output value of said second detected-position signal is the same as the minimum value in the A/D converting range of said second A/D converter, when said movable unit contacts a second vertical edge-point which is another of the edge-points of said vertical movement range corresponding to said first focal distance.

4. The anti-shake apparatus according to claim 2, wherein said first focal distance is a longest focal distance of said camera lens; and said coefficient value is based on said first focal distance divided by said second focal distance.

5. The anti-shake apparatus according to claim 1, wherein said movable unit has said magnetic-field change-detecting unit;

said fixed unit has said position-detecting magnet unit;

said magnetic-field change-detecting unit has one said horizontal magnetic-field change-detecting element and one said vertical magnetic-field change-detecting element; and said position-detecting magnet unit has a first position-detecting magnet which is used for detecting said first location and faces said horizontal magnetic-field change-detecting element, and a second position-detecting magnet which is used for detecting said second location and faces said vertical magnetic-field change-detecting element.

6. The anti-shake apparatus according to claim 5, wherein said movable unit has a first driving coil which is used for moving said movable unit in said first direction , and a second driving coil which is used for moving said movable unit in said second direction;

said first position-detecting magnet is used for moving said movable unit in said first direction; and said second position-detecting magnet is used for moving said movable unit in said second direction.

7. The anti-shake apparatus according to claim 1, wherein said magnetic-field change-detecting unit is a one-axis hall element; and said horizontal magnetic-field change-detecting element and said vertical magnetic-field change-detecting element are hall elements.

8. The anti-shake apparatus according to claim 1, further comprising a memory unit that is connected with said control unit, and stores said first optimized horizontal current-value and said first optimized vertical current-value;

a content which is stored in said memory unit is not deleted even if said memory unit is set to the off state.

* * * * *